(12) United States Patent
Shimizu

(10) Patent No.: US 9,448,403 B2
(45) Date of Patent: Sep. 20, 2016

(54) OPTICAL SCANNER, ACTUATOR, IMAGE DISPLAY DEVICE, AND HEAD-MOUNTED DISPLAY

(71) Applicant: Seiko Epson Corporation, Tokyo (JP)

(72) Inventor: Takeshi Shimizu, Chino (JP)

(73) Assignee: Seiko Epson Corporation (JP)

( * ) Notice: Subject to any disclaimer, the term of this patent is extended or adjusted under 35 U.S.C. 154(b) by 205 days.

(21) Appl. No.: 14/215,495

(22) Filed: Mar. 17, 2014

(65) Prior Publication Data

US 2014/0268267 A1 Sep. 18, 2014

(30) Foreign Application Priority Data

Mar. 18, 2013 (JP) .................................. 2013-055729

(51) Int. Cl.
*G02B 26/08* (2006.01)
*G02B 26/10* (2006.01)
*G02B 27/01* (2006.01)

(52) U.S. Cl.
CPC ........... *G02B 26/101* (2013.01); *G02B 26/085* (2013.01); *G02B 27/01* (2013.01); *H02K 11/24* (2016.01); *G02B 2027/014* (2013.01); *G02B 2027/0154* (2013.01)

(58) Field of Classification Search
CPC .............. G02B 26/101; G02B 26/105; G02B 26/0858; G02B 26/0841; G02B 26/085; G02B 26/0833; G02B 26/10; G02B 2027/014; G02B 27/01; G02B 27/0176; G02B 27/017; G01C 1915/09; G01C 1915/0907; G01C 1915/0915; G01C 1915/0922; G01C 19/5747; G01C 19/5712; G01C 19/5719; G01C 19/5729; H02K 11/24

USPC ...................... 359/201.1–201.2, 224.1–224.2
See application file for complete search history.

(56) References Cited

U.S. PATENT DOCUMENTS 6,278,538 B1 * 8/2001 Schleipen ............ G02B 26/106
235/457
6,952,304 B2 10/2005 Mushika et al.
(Continued)

FOREIGN PATENT DOCUMENTS

DE 10 2006 051 197 A1 5/2008
DE 10 2007 033 000 A1 1/2009
(Continued)

OTHER PUBLICATIONS

Extended European Search Report for Application No. EP 14 15 9816 dated Mar. 20, 2015 (9 pages).
(Continued)

*Primary Examiner* — James Phan
(74) *Attorney, Agent, or Firm* — Harness, Dickey & Pierce, P.L.C.

(57) ABSTRACT

An optical scanner includes: a movable portion that is provided with a light reflection portion and is swingable around a first axis; a frame body portion that is swingable around a second axis; a first shaft portion that connects the movable portion and the frame body portion; a fixed portion; a second shaft portion that connects the frame body portion and the fixed portion; a strain detection element that is disposed in the second shaft portion to detect deformation of the second shaft portion; a first signal processing portion to which a detection signal of the strain detection element is input and that outputs a signal based on bending deformation of the second shaft portion; and a second signal processing portion to which a detection signal of the strain detection element is input and that outputs a signal based on torsional deformation of the second shaft portion.

18 Claims, 21 Drawing Sheets

(56) References Cited

U.S. PATENT DOCUMENTS

| | | |
|---|---|---|
| 7,088,492 B2 | 8/2006 | Yanagita et al. |
| 7,442,918 B2 | 10/2008 | Sprague et al. |
| 2002/0044327 A1 | 4/2002 | Fujita et al. |
| 2010/0079837 A1* | 4/2010 | Akedo .................. G02B 26/10 359/224.1 |
| 2011/0199284 A1 | 8/2011 | Davis et al. |
| 2014/0268267 A1 | 9/2014 | Shimizu |

FOREIGN PATENT DOCUMENTS

| | | |
|---|---|---|
| EP | 1 708 004 A1 | 10/2006 |
| JP | 2002-040358 A | 2/2002 |
| JP | 2003-057570 A | 2/2003 |
| JP | 2003-185949 A | 7/2003 |
| JP | 2003-207737 A | 7/2003 |
| JP | 2004-226548 A | 8/2004 |
| JP | 2005-181576 A | 7/2005 |
| JP | 2007-522529 A | 8/2007 |
| JP | 2008-116678 A | 5/2008 |
| JP | 2010-097092 A | 4/2010 |
| JP | 2010-164954 A | 7/2010 |
| JP | 2012-053269 A | 3/2012 |
| WO | WO-02-061488 A1 | 8/2002 |
| WO | WO-2005-078509 A2 | 8/2005 |

OTHER PUBLICATIONS

Extended European Search Report for Application No. EP 14 15 9860 dated Jun. 12, 2014 (7 pages).

Ikeda, Masaaki et al., "Two Dimensional Silicon Micromachined Optical Scanner Integrated With Photo Detector and Piezoresistor", OMRON Corporation, Central R&D Laboratory, Japan, vol. 1, Jun. 25, 1995, pp. 293-296.

* cited by examiner

FIRST VOLTAGE
(HORIZONTAL SCANNING DRIVE SIGNAL)

SECOND VOLTAGE
(VERTICAL SCANNING DRIVE SIGNAL)

OPTICAL SCANNER, ACTUATOR, IMAGE DISPLAY DEVICE, AND HEAD-MOUNTED DISPLAY

BACKGROUND

1. Technical Field

The present invention relates to an optical scanner, an actuator, an image display device, and a head-mounted display.

2. Related Art

For example, optical scanners that are used in projectors, head-mounted displays, and the like to two-dimensionally scan light have been known (for example, see JP-A-2003-207737).

For example, the optical scanner described in JP-A-2003-207737 has a frame-like external frame (a fixed portion), an internal frame (a frame body portion) provided inside the external frame, a pair of second elastic beams (a second shaft portion) adapted to rotatably support the internal frame with respect to the external frame, a mirror portion (a movable portion) provided inside the internal frame, and a pair of first elastic beams (a first shaft portion) adapted to rotatably support the mirror portion with respect to the internal frame.

In the optical scanner, the internal frame is rotated relative to the external frame during torsional deformation of the second elastic beams, and the mirror portion is rotated relative to the internal frame during torsional deformation of the first elastic beams to two-dimensionally scan light reflected on the mirror portion.

In addition, in the optical scanner described in JP-A-2003-207737, a piezoresistor is disposed on the first elastic beam between the mirror portion and the internal frame. Accordingly, it is possible to detect the rotation of the mirror portion that is carried out due to the torsional deformation of the first elastic beams, based on a variation in resistance value of the piezoresistor.

In the optical scanner described in JP-A-2003-207737, the piezoresistor is provided on the first elastic beam between the mirror portion and the internal frame, and thus it is necessary to arrange wiring for supplying electric power to the piezoresistor and wiring for extracting a detection signal of the piezoresistor over an entire area on the second elastic beam between the internal frame and the external frame.

When the wirings are formed over the entire area on the second elastic beam as described above, the wirings pass on a portion where the amount of the deformation by the torsion of the second elastic beam reaches a maximum, and thus repetitive stress is received due to the torsional deformation of the elastic beam, and thus there is concern that the wirings may be disconnected.

SUMMARY

An advantage of some aspects of the invention is that it provides an optical scanner and an actuator capable of detecting a behavior of a movable portion using a strain detection element while suppressing disconnection of wiring connected to the strain detection element, and an image display device and a head-mounted display that are provided with the optical scanner and have excellent reliability.

An aspect of the invention is directed to an optical scanner including a movable portion that is provided with a light-reflective light reflection portion and is swingable around a first axis, a frame body portion that is swingable around a second axis that crosses the first axis, a first shaft portion that connects the movable portion and the frame body portion, a fixed portion, a second shaft portion that connects the frame body portion and the fixed portion, a strain detection element that is disposed in the second shaft portion to detect deformation of the second shaft portion, a first signal processing portion to which a detection signal of the strain detection element is input and that outputs a signal based on bending deformation of the second shaft portion, and a second signal processing portion to which a detection signal of the strain detection element is input and that outputs a signal based on torsional deformation of the second shaft portion.

According to the optical scanner, a behavior of the movable portion around the first axis can be detected based on the signal output from the first signal processing portion. In addition, a behavior of the movable portion around the second axis can be detected based on the signal output from the second signal processing portion.

Moreover, since the strain detection element is disposed in the second shaft portion, the wiring connected to the strain detection element is not required to be disposed over the entire area in a longitudinal direction of the second shaft portion. Therefore, disconnection of the wiring can be suppressed.

In the optical scanner of the aspect of the invention, it is preferable that a behavior of the movable portion around the first axis is detected based on the signal output from the first signal processing portion.

Accordingly, based on the detected behavior, the behavior of the movable portion around the first axis can be controlled to be turned into a desired state, or the behavior of the movable portion around the first axis and operations of other devices can be synchronized with each other.

In the optical scanner of the aspect of the invention, it is preferable that the strain detection element includes a piezoresistive region and a pair of terminals that is disposed side by side in a direction inclined with respect to a longitudinal direction of the second shaft portion on the piezoresistive region.

Accordingly, signals based on the bending deformation and the torsional deformation of the second shaft portion that are included in signals output from the strain detection element can be increased.

In the optical scanner of the aspect of the invention, it is preferable that the strain detection element is disposed at an end portion of the second shaft portion on the fixed portion side.

Accordingly, a portion where the wiring connected to the strain detection element is disposed in the second shaft portion can be reduced.

In the optical scanner of the aspect of the invention, it is preferable that an observer is used to estimate the behavior of the movable portion around the first axis based on the signal output from the first signal processing portion.

Accordingly, the behavior of the movable portion around the first axis can be detected based on the signal output from the first signal processing portion even when the movable portion is swung around the first axis in a non-resonant state.

In the optical scanner of the aspect of the invention, it is preferable that a ratio between an amplitude at a resonance frequency related to the swinging of the movable portion around the first axis and an amplitude at a resonance frequency related to the swinging of the frame body portion around the first axis is used to estimate the behavior of the movable portion around the first axis based on the signal output from the first signal processing portion.

Accordingly, the behavior of the movable portion around the first axis can be detected with high accuracy with a relatively simple configuration, based on the signal output from the first signal processing portion.

In the optical scanner of the aspect of the invention, it is preferable that a pair of the second shaft portions are provided with the frame body portion interposed therebetween, and the strain detection element be disposed in each of the pair of second shaft portions.

Accordingly, the signal based on the bending deformation of the second shaft portion and the signal based on the torsional deformation of the second shaft portion can be efficiently extracted from detection signals of the pair of strain detection elements.

In the optical scanner of the aspect of the invention, it is preferable that a behavior of the movable portion around the second axis is detected based on the signal output from the second signal processing portion.

Accordingly, based on the detected behavior, the behavior of the movable portion around the second axis can be controlled to be turned into a desired state, or the behavior of the movable portion around the second axis and operations of other devices can be synchronized with each other.

Another aspect of the aspect of the invention is directed to an optical scanner including a movable portion that is provided with a light-reflective light reflection portion and is swingable around a first axis, a frame body portion that is swingable around a second axis that crosses the first axis, a first shaft portion that connects the movable portion and the frame body portion, a fixed portion, and a second shaft portion that connects the frame body portion and the fixed portion, in which a strain detection element is disposed only in the second shaft portion, and detection signals of the strain detection element include signals based on bending deformation and torsional deformation of the second shaft portion.

According to the optical scanner, behaviors of the movable portion around the first axis and the second axis can be detected based on the detection signals of the strain detection element. In addition, wiring connected to the strain detection element is not required to be disposed over the entire area in a longitudinal direction of the second shaft portion. Therefore, disconnection of the wiring can be suppressed.

Still another aspect of the invention is directed to an actuator that has a gimbal structure in which a movable portion is supported swingably around a first axis with a first shaft portion that is supported by a frame body portion inside the frame body portion and the frame body portion is supported swingably around a second axis that crosses the first axis with a second shaft portion outside the frame body portion, including a strain detection element that is disposed in the second shaft portion to detect deformation of the second shaft portion, in which signals based on bending deformation and torsional deformation of the second shaft portion that are included in detection signals of the strain detection element are used to detect behaviors of the movable portion around the first axis and the second axis.

According to the actuator, the behaviors of the movable portion around the first axis and the second axis can be detected based on the detection signals of the strain detection element. In addition, wiring connected to the strain detection element is not required to be disposed over the entire area in a longitudinal direction of the second shaft portion. Therefore, disconnection of the wiring can be suppressed.

Yet another aspect of the invention is directed to an image display device including the optical scanner of the aspect of the invention, and a light source that emits light, in which the light emitted from the light source is reflected on the light reflection portion to display an image.

Accordingly, an image display device having excellent reliability can be provided.

Yet another aspect of the invention is directed to a head-mounted display including the optical scanner of the aspect of the invention, and a light source that emits light, in which the light emitted from the light source is reflected on the light reflection portion to display an image as a virtual image.

Accordingly, a head-mounted display having excellent reliability can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an optical scanner, an actuator, an image display device, and a head-mounted display of the invention will be described with reference to the accompanying drawings. Herein, an exemplary case in which the actuator according to the invention is applied to the optical scanner will be described, but the actuator of the invention is not limited to this case, and for example, can also be applied to other optical devices such as optical switches and optical attenuators.

Optical Scanner

First Embodiment

Figure 1:
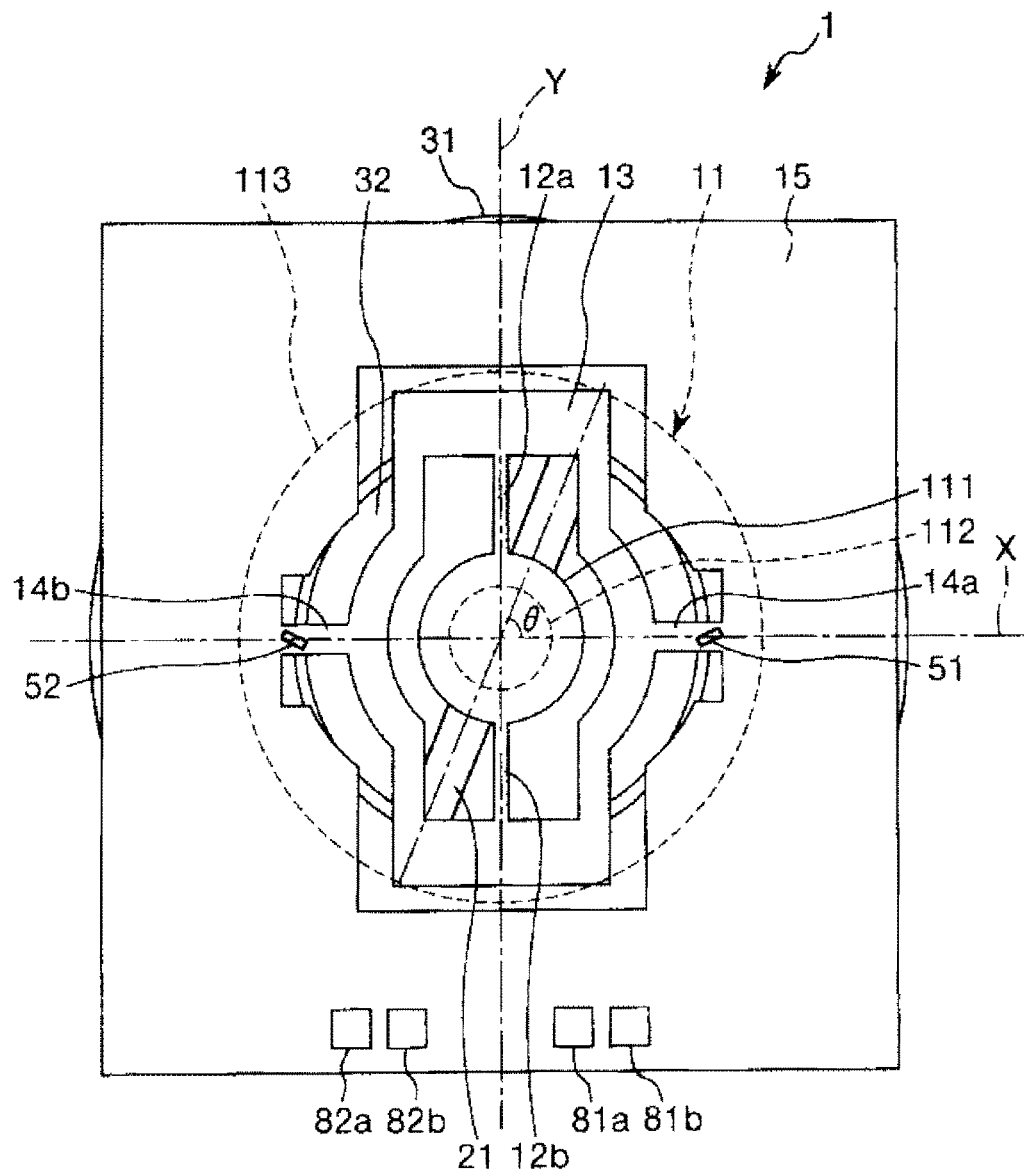
FIG. 1 is a plan view showing an optical scanner according to a first embodiment of the invention.
Figure 2:
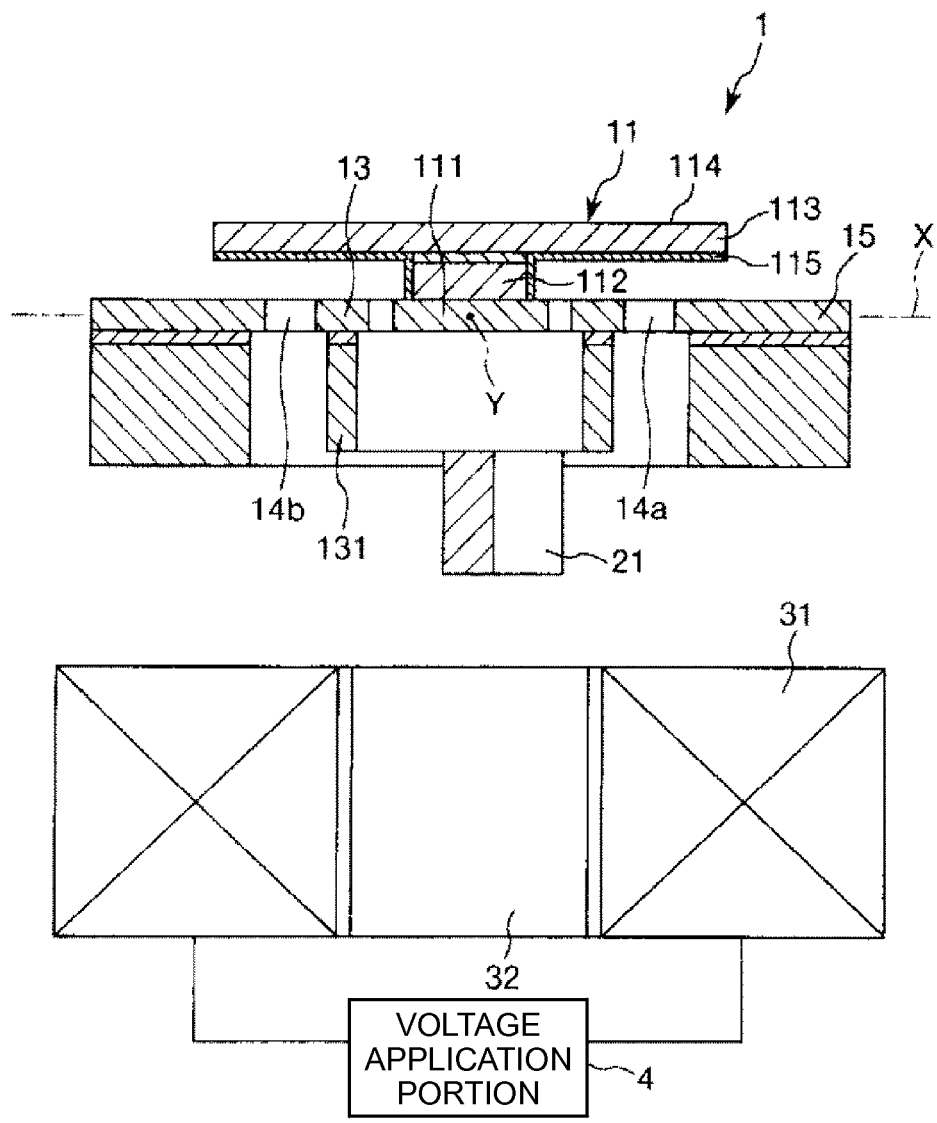
FIG. 2 is a cross-sectional diagram of the optical scanner shown in FIG. 1 (a cross-sectional view taken along an X-axis).
Figure 3:
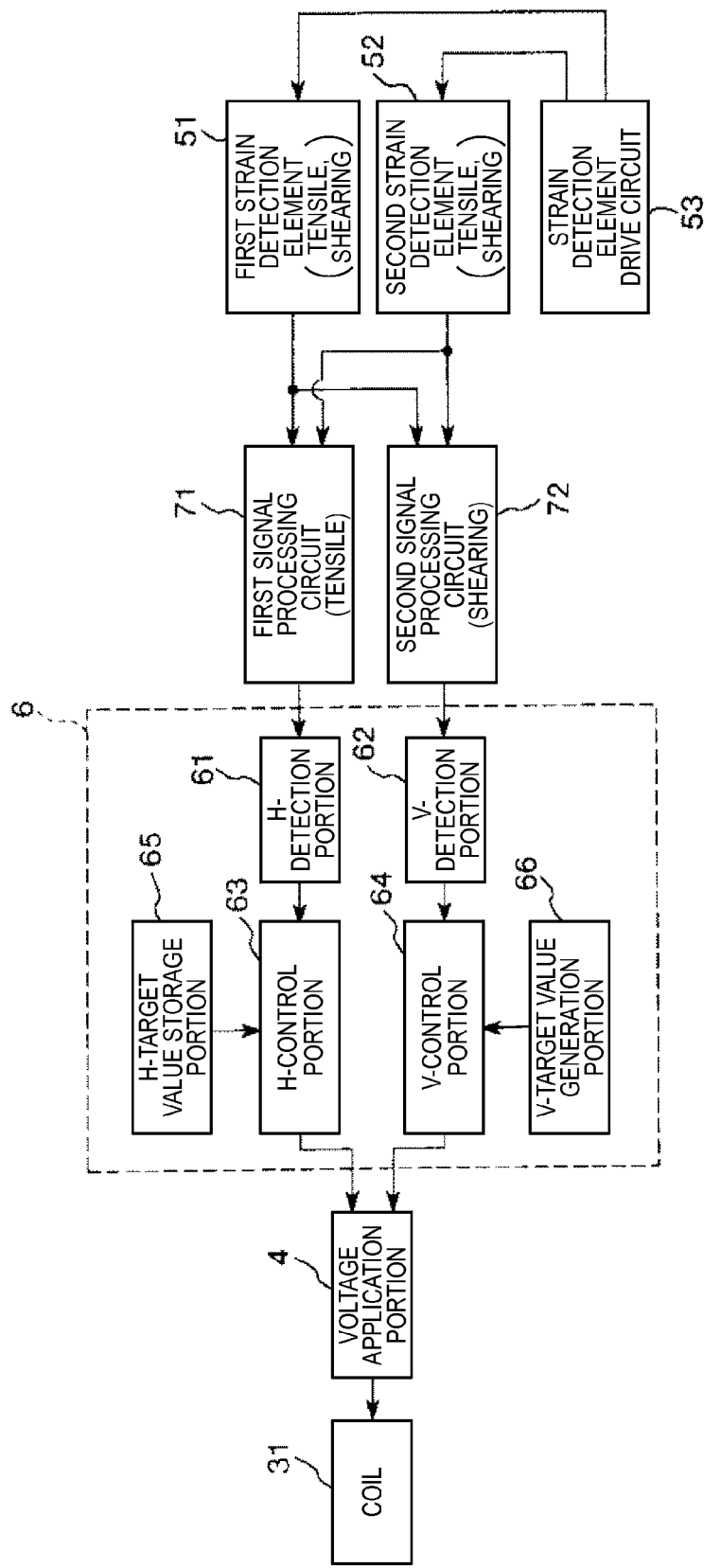
FIG. 3 is a block diagram showing a control system of the optical scanner shown in FIG. 1.
Figure 4:
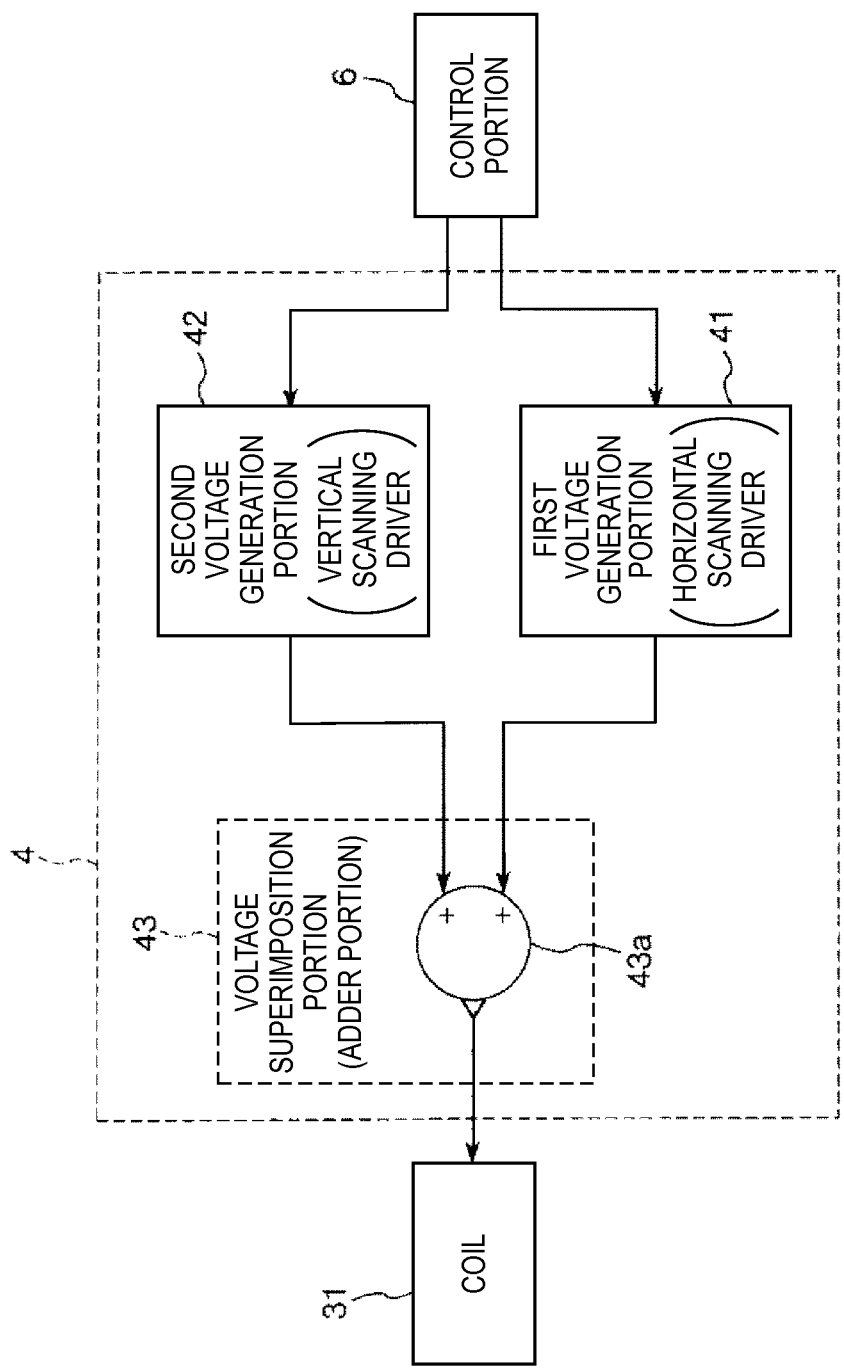
FIG. 4 is a block diagram for illustrating a voltage application portion of a drive portion of the optical scanner shown in FIG. 1.
Figure 5A:
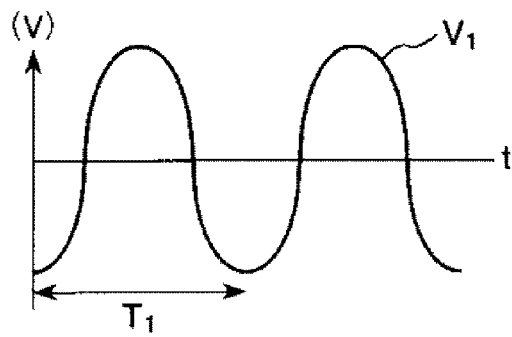
FIGS. 5A and 5B are diagrams showing examples of voltages generated by the first voltage generation portion and the second voltage generation portion shown in FIG. 4.
Figure 5B:
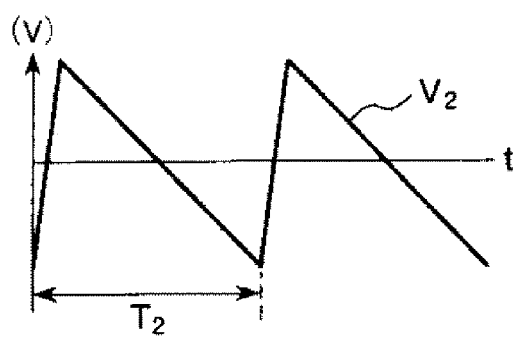

FIG. 1 is a plan view showing an optical scanner according to a first embodiment of the invention, FIG. 2 is a cross-sectional view (a cross-sectional view taken along an X-axis) of the optical scanner shown in FIG. 1, and FIG. 3 is a block diagram showing a control system of the optical scanner shown in FIG. 1. In addition, FIG. 4 is a block diagram for illustrating a voltage application portion of a drive portion of the optical scanner shown in FIG. 1, and FIGS. 5A and 5B are diagrams showing examples of voltages generated by the first voltage generation portion and the second voltage generation portion shown in FIG. 4.

Hereinafter, for the sake of convenience of description, the upper side in FIG. 2 will be referred to as "upper" and the lower side will be referred to as "lower".

As shown in FIGS. 1 and 2, an optical scanner 1 is provided with a movable mirror portion 11, a pair of shaft portions (a first shaft portion) 12a and 12b, a frame body portion 13, a pair of shaft portions 14a and 14b (a second shaft portion), a fixed portion 15, a permanent magnet 21, a coil 31, a core 32, a voltage application portion 4, a strain detection element (a first strain detection element) 51, and a strain detection element (a second strain detection element) 52.

Here, the movable mirror portion 11 and the pair of shaft portions 12a and 12b configure a first vibration system that is swung (rotated in a reciprocating manner) around a Y-axis (a first axis). The movable mirror portion 11, the pair of shaft portions 12a and 12b, the frame body portion 13, the pair of shaft portions 14a and 14b, and the permanent magnet 21 configure a second vibration system that is swung (rotated in a reciprocating manner) around an X-axis (a second axis).

The permanent magnet 21, the coil 31, and the voltage application portion 4 configure a drive portion that drives the above-described first and second vibration systems (that is, that swings the movable mirror portion 11 around the X-axis and the Y-axis) through the interaction of the magnetic fields of the permanent magnet 21 and the coil 31.

Particularly, in the optical scanner 1, strain detection elements 51 and 52 are disposed in the shaft portions 14a and 14b, and detection signals of the strain detection elements 51 and 52 include signals based on the bending deformation and the torsional deformation of the shaft portions 14a and 14b, respectively, and are input to a first signal processing circuit 71 and a second signal processing circuit 72 as shown in FIG. 3. The first signal processing circuit 71 outputs signals based on the bending deformation of the shaft portions 14a and 14b. The signals output from the first signal processing circuit 71 are input to a control portion 6. The control portion 6 detects a behavior of the movable mirror portion 11 around the Y-axis based on the signals output from the first signal processing circuit 71. In this manner, the behavior of the movable mirror portion 11 around the Y-axis is detected, using the signals based on the bending deformation of the shaft portions 14a and 14b that are included in the detection signals of the strain detection elements 51 and 52. Accordingly, wiring (not shown) connected to the strain detection elements 51 and 52 is not required to be disposed in the shaft portions 12a and 12b or to be disposed over the entire area in a longitudinal direction of the shaft portion 14a or 14b. Therefore, disconnection of the wiring can be suppressed.

In addition, the second signal processing circuit 72 outputs signals based on the torsional deformation of the shaft portions 14a and 14b. The signals output from the second signal processing circuit 72 are input to the control portion 6. The control portion 6 detects a behavior of the movable mirror portion 11 around the X-axis based on the signals output from the second signal processing circuit 72. In this manner, the behavior of the movable mirror portion 11 around the X-axis is detected, using the signals based on the torsional deformation of the shaft portions 14a and 14b that are included in the signals output from the strain detection elements 51 and 52.

Hereinafter, the respective portions of the optical scanner 1 will be sequentially described in detail.

The movable mirror portion 11 has a base portion (a movable portion) 111 and a light reflection plate 113 fixed to the base portion 111 via a spacer 112. Here, the base portion (the movable portion) 111 functions swingably (rotatably) relative to the fixed portion 15.

A light-reflective light reflection portion 114 is provided on an upper surface (one surface) of the light reflection plate 113.

The light reflection plate 113 is disposed apart from the shaft portions 12a and 12b in a thickness direction of the light reflection plate 113, and is provided to overlap the shaft portions 12a and 12b when viewed in the thickness direction (hereinafter, may also be represented as "when viewed from above").

Therefore, it is possible to increase the area of the plate surface of the light reflection plate 113 while reducing the distance between the shaft portions 12a and 12b. In addition, since the distance between the shaft portions 12a and 12b can be reduced, the frame body portion 13 can be reduced in size. Furthermore, since the frame body portion 13 can be reduced in size, the distance between the shaft portions 14a and 14b can be reduced.

Accordingly, the optical scanner 1 can be reduced in size while the area of the plate surface of the light reflection plate 113 is increased.

In addition, the light reflection plate 113 is formed to completely cover the shaft portions 12a and 12b when viewed from above. In other words, each of the shaft portions 12a and 12b is positioned inside the outer periphery of the light reflection plate 113 when viewed from above. Accordingly, the area of the plate surface of the light reflection plate 113 is increased, and as a result, the area of the light reflection portion 114 can be increased. In addition, it is possible to suppress unnecessary light (for example, light that was not able to enter the light reflection portion 114) from being reflected on the shaft portions 12a and 12b and becoming stray light.

In addition, the light reflection plate 113 is formed to completely cover the frame body portion 13 when viewed from above. In other words, the frame body portion 13 is positioned inside the outer periphery of the light reflection plate 113 when viewed from above. Accordingly, the area of the plate surface of the light reflection plate 113 is increased, and as a result, the area of the light reflection portion 114 can be increased. In addition, it is possible to suppress unnecessary light from being reflected on the frame body portion 13 and becoming stray light.

Furthermore, the light reflection plate 113 is formed to completely cover the shaft portions 14a and 14b when viewed from above. In other words, each of the shaft portions 14a and 14b is positioned inside the outer periphery of the light reflection plate 113 when viewed from above. Accordingly, the area of the plate surface of the light reflection plate 113 is increased, and as a result, the area of the light reflection portion 114 can be increased. In addition, it is possible to suppress unnecessary light from being reflected on the shaft portions 14a and 14b and becoming stray light.

In this embodiment, the light reflection plate 113 has an annular shape when viewed from above. The shape of the light reflection plate 113 when viewed from above is not limited thereto, and for example, an elliptical shape or a polygonal shape such as a rectangular shape is also possible. In addition, when the light reflection plate 113 has a protruding shape in directions along the X-axis and the Y-axis when viewed from above, stray light in each shaft portion can be efficiently reduced while the moment of inertia of the light reflection plate 113 is suppressed to be small.

A hard layer 115 is provided on a lower surface (the other surface, the surface on the side of the base portion 111 of the light reflection plate 113) of the light reflection plate 113.

The hard layer 115 is made from a harder material than a constituent material of the main body of the light reflection plate 113. Accordingly, the stiffness of the light reflection plate 113 can be increased. Therefore, distortion of the light reflection plate 113 during the swinging can be suppressed. In addition, the thickness of the light reflection plate 113 is reduced, and thus the moment of inertia of the light reflection plate 113 during the swinging around the X-axis and the Y-axis can be suppressed.

The constituent material of the hard layer 115 is not particularly limited as long as it is harder than the constituent material of the main body of the light reflection plate 113, and for example, diamond, crystal, sapphire, lithium tantalite, potassium niobate, a carbon nitride film, and the like can be used. Particularly, diamond is preferably used.

The (average) thickness of the hard layer 115 is not particularly limited. It is preferably about 1 μm to 10 μm, and more preferably about 1 μm to 5 μm.

The hard layer 115 may be configured as a single layer or a laminate of a plurality of layers. The hard layer 115 may be provided over a part or the whole of the lower surface of the light reflection plate 113. The hard layer 115 is provided if necessary and may be omitted.

Examples of methods that can be used to form the hard layer 115 include chemical vapor deposition (CVD) such as plasma CVD, thermal CVD, and laser CVD, dry plating such as vacuum deposition, sputtering, and ion plating, wet plating such as electroplating, immersion plating, and electroless plating, thermal spraying, and bonding of a sheet-like member.

The lower surface of the light reflection plate 113 is fixed to the base portion 111 via the spacer 112. Accordingly, it is possible to swing the light reflection plate 113 around the Y-axis while suppressing its contact with the shaft portions 12a and 12b, the frame body portion 13, and the shaft portions 14a and 14b.

In addition, the base portion 111 is positioned inside the outer periphery of the light reflection plate 113 when viewed from above. The area of the base portion 111 when viewed from above is preferably as small as possible as long as the base portion 111 can support the light reflection plate 113 via the spacer 112. Accordingly, it is possible to reduce the distance between the shaft portions 12a and 12b while increasing the area of the plate surface of the light reflection plate 113.

The frame body portion 13 has a frame shape and is provided around the base portion 111 of the above-described movable mirror portion 11. In other words, the base portion 111 of the movable mirror portion 11 is provided inside the frame body portion 13 that is of a frame shape.

When viewed from above, the frame body portion 13 has a shape along an outer shape of the structural body formed of the base portion 111 of the movable mirror portion 11 and the pair of shaft portions 12a and 12b. Accordingly, it is possible to reduce the frame body portion 13 in size while permitting the vibration of the first vibration system configured to include the movable mirror portion 11 and the pair of shaft portions 12a and 12b, that is, the swinging of the movable mirror portion 11 around the Y-axis.

The frame body portion 13 has a rib 131 that protrudes beyond the shaft portions 12a, 12b, 14a, and 14b in a thickness direction of the frame body portion 13. By virtue of the rib 131, deformation of the frame body portion 13 can be reduced. The rib 131 also has a function of suppressing the contact between the movable mirror portion 11 and the permanent magnet 21 (functions as a spacer).

The shape of the frame body portion 13 is not limited to one shown in the drawing as long as it is a frame shape.

The frame body portion 13 is provided so that a length in a direction along the Y-axis is longer than a length in a direction along the X-axis. Accordingly, it is possible to reduce the length of the optical scanner 1 in the direction along the X-axis while securing the length necessary for the shaft portions 12a and 12b.

The frame body portion 13 is supported by the fixed portion 15 via the shaft portions 14a and 14b. In addition, the base portion 111 of the movable mirror portion 11 is supported by the frame body portion 13 via the shaft portions 12a and 12b.

Each of the shaft portions 12a, 12b, 14a, and 14b can be elastically deformed.

The shaft portions 12a and 12b (the first shaft portion) connect the movable mirror portion 11 and the frame body portion 13 so that the movable mirror portion 11 is swingable (rotatable) around the Y-axis (the first axis). The shaft portions 14a and 14b (the second shaft portion) connect the frame body portion 13 and the fixed portion 15 so that the frame body portion 13 is swingable (rotatable) around the X-axis (the second axis) perpendicular to the Y-axis.

More specifically, the shaft portions 12a and 12b are disposed to be opposed to each other via the base portion 111 of the movable mirror portion 11 (with the base portion 111 interposed therebetween).

Each of the shaft portions 12a and 12b has a longitudinal shape (a rod shape) extending in the direction along the Y-axis. Each of the shaft portions 12a and 12b is connected to the base portion 111 at one end portion and is connected to the frame body portion 13 at the other end portion. In addition, each of the shaft portions 12a and 12b is disposed so that the central axis thereof corresponds to the Y-axis.

In this manner, the shaft portions 12a and 12b support the base portion 111 of the movable mirror portion 11 from the both sides. Each of the shaft portions 12a and 12b is torsionally deformed along with the swinging of the movable mirror portion 11 around the Y-axis.

The shape of each of the shaft portions 12a and 12b is not limited to the above-described one as long as the movable mirror portion 11 is supported swingably around the Y-axis relative to the frame body portion 13. For example, the shaft portions 12a and 12b may have a bent or curved portion, a branched portion, or a portion having a different width in at least one place therein.

The shaft portions 14a and 14b are disposed to be opposed to each other via the frame body portion 13.

Each of the pair of shaft portions 14a and 14b is disposed along the X-axis when viewed from above and has a longitudinal shape (a rod shape) along the X-axis. Each of the shaft portions 14a and 14b is connected to the frame body portion 13 at one end portion and is connected to the fixed portion 15 at the other end portion. In addition, each of the shaft portions 14a and 14b is disposed so that the central axis thereof corresponds to the X-axis.

In this manner, the shaft portions 14a and 14b support the frame body portion 13 from the both sides. Each of the shaft portions 14a and 14b is torsionally deformed along with the swinging of the frame body portion 13 around the X-axis.

The shape of each of the shaft portions 14a and 14b is not limited to the above-described one as long as the frame body portion 13 is supported swingably around the X-axis relative to the fixed portion 15. For example, the shaft portions 14a and 14b may have a bent or curved portion, a branched portion, or a portion having a different width in at least one place therein.

The movable mirror portion 11 (in other words, the light reflection plate 113) can be made swingable (rotatable) around two axes, i.e., the X-axis and the Y-axis perpendicular to each other by making the movable mirror portion 11 swingable around the Y-axis and by making the frame body portion 13 swingable around the X-axis.

As described above, the base portion 111, the shaft portions 12a and 12b, the frame body portion 13, the shaft portions 14a and 14b, and the fixed portion 15 are formed integrally with each other.

In this embodiment, the base portion 111, the shaft portions 12a and 12b, the frame body portion 13, the shaft portions 14a and 14b, and the fixed portion 15 are formed by etching of a SOI substrate in which a first Si layer (a device layer), a $SiO_2$ layer (a box layer), and a second Si layer (a handle layer) are laminated in this order. Accordingly, it is possible to ensure excellent vibration characteristics of the first and second vibration systems. In addition, the SOI substrate can be subjected to fine processing through etching. Accordingly, the base portion 111, the shaft portions 12a and 12b, the frame body portion 13, the shaft portions 14a and 14b, and the fixed portion 15 are formed using the SOI substrate, and thus excellent dimension accuracy thereof can be ensured and the optical scanner 1 can be reduced in size.

Each of the base portion 111 and the shaft portions 12a, 12b, 14a, and 14b is configured to include the first Si layer of the SOI substrate. Accordingly, it is possible to ensure excellent elasticity of the shaft portions 12a, 12b, 14a, and 14b. In addition, it is possible to suppress the base portion 111 from being brought into contact with the frame body portion 13 when being rotated around the Y-axis.

Here, the first Si layer of the SOI substrate is a p-type silicon single crystal substrate or an n-type silicon single crystal substrate. For example, when the first Si layer is a p-type silicon single crystal substrate of a (100) plane, the shaft portions 14a and 14b extend in a <110> direction of the crystal axis of the p-type silicon single crystal substrate of the (100) plane. When the first Si layer is an n-type silicon single crystal substrate of a (100) plane, the shaft portions 14a and 14b extend in a <100> direction of the crystal axis of the n-type silicon single crystal substrate of the (100) plane.

Each of the frame body portion 13 and the fixed portion 15 is configured to include a laminate formed of the first Si layer, the $SiO_2$ layer, and the second Si layer of the SOI substrate. Accordingly, it is possible to excellent stiffness to the frame body portion 13 and the fixed portion 15.

The $SiO_2$ layer and the second Si layer of the frame body portion 13, that is, a portion that protrudes in the thickness direction beyond the shaft portions 12a and 12b or the shaft portions 14a and 14b of the frame body portion 13 configure the above-described rib 131 that increases the stiffness of the frame body portion 13.

The upper surface of a portion (in this embodiment, the fixed portion 15) positioned outside the light reflection plate 113 is preferably subjected to an antireflection process. Accordingly, it is possible to suppress unnecessary light that is irradiated on a portion other than the light reflection plate 113 from becoming stray light.

The antireflection process is not particularly limited, and examples thereof include formation of an antireflection film (a dielectric multilayer), roughening, and blackening.

The above-described constituent materials and forming methods of the base portion 111, the shaft portions 12a and 12b, the frame body portion 13, the shaft portions 14a and 14b, and the fixed portion 15 are just example, and the invention is not limited thereto. For example, the base portion 111, the shaft portions 12a and 12b, the frame body portion 13, the shaft portions 14a and 14b, and the fixed portion 15 may be formed by etching of a silicon substrate.

In addition, in this embodiment, the spacer 112 and the light reflection plate 113 are formed by etching of a SOI substrate. In addition, the spacer 112 is configured to include a laminate formed of the $SiO_2$ layer and the second Si layer of the SOI substrate. The light reflection plate 113 is configured to include the first Si layer of the SOI substrate.

By forming the spacer 112 and the light reflection plate 113 using the SOI substrate, the spacer 112 and the light reflection plate 113 bonded to each other can be simply manufactured with high accuracy.

The spacer 112 is bonded to the base portion 111 using a bonding material such as an adhesive or a brazing filler metal (not shown).

The fixed portion 15 is not limited to the above-described one as long as it supports the frame body portion 13. For example, the fixed portion 15 may have a body separated from the shaft portions 14a and 14b.

The permanent magnet 21 is bonded to a lower surface of the above-described frame body portion 13 (a surface on the opposite side to the light reflection plate 113), that is, a tip end surface of the rib 131.

The method of bonding the permanent magnet 21 to the frame body portion 13 is not particularly limited, and for example, a bonding method using an adhesive can be used.

The permanent magnet 21 is magnetized in a direction inclined with respect to the X-axis and the Y-axis when viewed from above.

In this embodiment, the permanent magnet 21 has a longitudinal shape (a rod shape) extending in the direction inclined with respect to the X-axis and the Y-axis. The permanent magnet 21 is magnetized in a longitudinal direction thereof. That is, the permanent magnet 21 is magnetized so that one end portion becomes an S pole and the other end portion becomes an N pole.

In addition, the permanent magnet 21 is provided to be symmetric with respect to an intersection point of the X-axis and the Y-axis as a center when viewed from above.

In this embodiment, the example in which one permanent magnet is installed in the frame body portion 13 has been described, but the invention is not limited thereto. For example, two permanent magnets may be installed in the frame body portion 13. In this case, for example, the two permanent magnets having a long length may be installed in the frame body portion 13 so as to be opposed to each other via the base portion 111 and to be parallel to each other when viewed from above.

Although an inclination angle θ of the magnetization direction of the permanent magnet 21 with respect to the X-axis is not particularly limited, it is preferably 30° to 60°, more preferably 30° to 45°, and even more preferably 45°. By providing the permanent magnet 21 as described above, the movable mirror portion 11 can be rotated around the X-axis smoothly and securely.

When the inclination angle θ is less than the above lower limit value, the movable mirror portion 11 may not be sufficiently rotated around the X-axis according to the conditions such as a strength of a voltage that is applied to the coil 31 by the voltage application portion 4. When the inclination angle θ is greater than the above upper limit value, the movable mirror portion 11 may not be sufficiently rotated around the Y-axis according to the conditions.

Preferable examples of the permanent magnet 21 include a neodymium magnet, a ferrite magnet, a samarium-cobalt magnet, an alnico magnet, and a bonded magnet. The permanent magnet 21 is provided by magnetizing a hard magnetic body. For example, it is formed by installing a hard magnetic body before magnetization in the frame body portion 13 and by then magnetizing the hard magnetic body. When the permanent magnet 21 already magnetized is installed in the frame body portion 13, it may not be installed at a desired position due to the effects of an external magnetic field and magnetic fields of other components.

The coil 31 is provided just below the permanent magnet 21. That is, the coil 31 is provided to be opposed to the lower surface of the frame body portion 13. Accordingly, it is possible to allow a magnetic field that is generated from the coil 31 to efficiently act on the permanent magnet 21. Accordingly, the power consumption and the size of the optical scanner 1 can be reduced.

In this embodiment, the coil 31 is provided to be wound around the core 32. Accordingly, it is possible to allow a magnetic field that is generated from the coil 31 to efficiently act on the permanent magnet 21. The core 32 may be omitted.

The coil 31 is electrically connected to the voltage application portion 4.

A magnetic field is generated in a direction perpendicular to the X-axis and the Y-axis from the coil 31 by applying a voltage to the coil 31 using the voltage application portion 4.

As shown in FIG. 4, the voltage application portion 4 is provided with a first voltage generation portion 41 that generates a first voltage $V_1$ for rotating the movable mirror portion 11 around the Y-axis, a second voltage generation portion 42 that generates a second voltage $V_2$ for rotating the movable mirror portion 11 around the X-axis, and a voltage superimposition portion 43 that superimposes the first voltage $V_1$ and the second voltage $V_2$, and applies voltages obtained by the superimposition of the voltage superimposition portion 43 to the coil 31.

The first voltage generation portion 41 generates a first voltage $V_1$ (a voltage for horizontal scanning) that changes periodically with a period $T_1$, as shown in FIG. 5A. That is, the first voltage generation portion 41 generates a first voltage $V_1$ of a first frequency ($1/T_1$).

The first voltage $V_1$ forms a sinusoidal waveform. Therefore, the optical scanner 1 can effectively perform main scanning of light. The waveform of the first voltage $V_1$ is not limited thereto.

The first frequency ($1/T_1$) is not particularly limited as long as it is a frequency appropriate for horizontal scanning. The first frequency is preferably 10 kHz to 40 kHz.

In this embodiment, the first frequency is set to be equal to a torsional resonance frequency (f1) of the first vibration system (the torsional vibration system) configured to include the movable mirror portion 11 and the pair of shaft portions 12a and 12b. That is, the first vibration system is designed (manufactured) so that the torsional resonance frequency (f1) becomes a frequency appropriate for horizontal scanning. Accordingly, the rotation angle of the movable mirror portion 11 around the Y-axis can be increased.

The second voltage generation portion 42 generates a second voltage $V_2$ (a voltage for vertical scanning) that changes periodically with a period $T_2$ different from the period $T_1$, as shown in FIG. 5B. That is, the second voltage generation portion 42 generates a second voltage $V_2$ of a second frequency ($1/T_2$).

The second voltage $V_2$ forms a sawtooth waveform. Therefore, the optical scanner 1 can effectively perform vertical scanning (auxiliary scanning) of light. The waveform of the second voltage $V_2$ is not limited thereto.

The second frequency ($1/T_2$) is not particularly limited as long as it is a frequency that is different from the first frequency ($1/T_1$) and is appropriate for vertical scanning.

The second frequency is preferably 30 Hz to 120 Hz (about 60 Hz). When the frequency of the second voltage $V_2$ is set to about 60 Hz and the frequency of the first voltage $V_1$ is set to 10 kHz to 40 kHz as described above, the movable mirror portion 11 can be rotated around the two axes (the X-axis and the Y-axis) perpendicular to each other at a frequency appropriate for drawing in the display. The combination of the frequency of the first voltage $V_1$ and the frequency of the second voltage $V_2$ is not particularly limited when the movable mirror portion 11 can be rotated around the X-axis and the Y-axis.

In this embodiment, the frequency of the second voltage $V_2$ is adjusted to be different from a torsional resonance frequency (a resonance frequency) of the second vibration system (the torsional vibration system) configured to include the movable mirror portion 11, the pair of shaft portions 12a and 12b, the frame body portion 13, the pair of shaft portions 14a and 14b, and the permanent magnet 21.

The frequency (the second frequency) of the second voltage $V_2$ is preferably less than the frequency (the first frequency) of the first voltage $V_1$. That is, the period $T_2$ is preferably longer than the period $T_1$. Accordingly, the movable mirror portion 11 can be more securely and smoothly rotated around the Y-axis at the first frequency and around the X-axis at the second frequency.

In addition, when the torsional resonance frequency of the first vibration system is represented by f1 [Hz] and the torsional resonance frequency of the second vibration system is represented by f2 [Hz], f1 and f2 preferably satisfy a relationship of f2<f1, and more preferably a relationship of f1≥10f2. Accordingly, the movable mirror portion 11 can be more smoothly rotated around the Y-axis at the frequency of the first voltage $V_1$ and around the X-axis at the frequency of the second voltage $V_2$. In the case of f1≤f2, the first vibration system may vibrate due to the second frequency.

Each of the first voltage generation portion 41 and the second voltage generation portion 42 is connected to the control portion 6 and is driven based on a signal from the control portion 6. The voltage superimposition portion 43 is connected to the first voltage generation portion 41 and the second voltage generation portion 42.

The voltage superimposition portion 43 is provided with an adder 43a for applying a voltage to the coil 31. The adder 43a receives a first voltage $V_1$ from the first voltage generation portion 41 and receives a second voltage $V_2$ from the second voltage generation portion 42 to superimpose and apply the voltages to the coil 31.

Next, a method of driving the optical scanner 1 will be described. In this embodiment, as described above, the frequency of the first voltage $V_1$ is set to be equal to the torsional resonance frequency of the first vibration system, and the frequency of the second voltage $V_2$ is set to be different from the torsional resonance frequency of the second vibration system and be less than the frequency of the first voltage $V_1$ (for example, the frequency of the first voltage $V_1$ is set to 18 kHz and the frequency of the second voltage $V_2$ is set to 60 Hz).

For example, the first voltage $V_1$ as shown in FIG. 5A and the second voltage $V_2$ as shown in FIG. 5B are superimposed by the voltage superimposition portion 43, and the superimposed voltages are applied to the coil 31.

As a result, by the first voltage $V_1$, a magnetic field (this magnetic field is referred to as "magnetic field A1") that draws one magnetic pole of the permanent magnet 21 to the coil 31 and separates the other magnetic pole of the permanent magnet 21 from the coil 31, and a magnetic field (this magnetic field is referred to as "magnetic field A2") that separates one magnetic pole of the permanent magnet 21 from the coil 31 and draws the other magnetic pole of the permanent magnet 21 to the coil 31 are alternately switched.

Here, as described above, the N pole of the permanent magnet 21 is positioned on one side and the S pole of the permanent magnet 21 is positioned on the other side with the Y-axis interposed therebetween when viewed from above in FIG. 1. Therefore, when the magnetic fields A1 and A2 are alternately switched, a vibration having a torsional vibration component around the Y-axis is excited to the frame body portion 13, and along with the vibration, the shaft portions 12a and 12b are torsionally deformed and the movable mirror portion 11 is rotated around the Y-axis at the frequency of the first voltage $V_1$.

In addition, the frequency of the first voltage $V_1$ is equal to the torsional resonance frequency of the first vibration system. Therefore, the movable mirror portion 11 can be efficiently rotated around the Y-axis by the first voltage $V_1$. That is, even when the above-described vibration having a torsional vibration component around the Y-axis of the frame body portion 13 is small, the rotation angle of the movable mirror portion 11 around the Y-axis along with the vibration can be increased.

Meanwhile, by the second voltage $V_2$, a magnetic field (this magnetic field is referred to as "magnetic field B1") that draws one magnetic pole of the permanent magnet 21 to the coil 31 and separates the other magnetic pole of the permanent magnet 21 from the coil 31, and a magnetic field (this magnetic field is referred to as "magnetic field B2") that separates one magnetic pole of the permanent magnet 21 from the coil 31 and draws the other magnetic pole of the permanent magnet 21 to the coil 31 are alternately switched.

Here, as described above, the N pole of the permanent magnet 21 is positioned on one side and the S pole of the permanent magnet 21 is positioned on the other side with the X-axis interposed therebetween when viewed from above in FIG. 1. Therefore, when the magnetic fields B1 and B2 are alternately switched, the frame body portion 13 is rotated around the X-axis at the frequency of the second voltage $V_2$ along with the movable mirror portion 11 while the respective shaft portions 14a and 14b are torsionally deformed.

In addition, the frequency of the second voltage $V_2$ is set to be significantly less than the frequency of the first voltage $V_1$. In addition, the torsional resonance frequency of the second vibration system is designed to be less than the torsional resonance frequency of the first vibration system. Therefore, it is possible to suppress the movable mirror portion 11 from being rotated around the Y-axis at the frequency of the second voltage $V_2$.

As described above, by applying voltages obtained by superimposing the first voltage $V_1$ and the second voltage $V_2$ to the coil 31, the movable mirror portion 11 can be rotated around the Y-axis at the frequency of the first voltage $V_1$ and around the X-axis at the frequency of the second voltage $V_2$. Accordingly, the device cost and the size of the device can be reduced, and the movable mirror portion 11 can be rotated around the X-axis and the Y-axis using an electromagnetic drive method (a moving magnet method). In addition, since the number of constituent components (the permanent magnet and the coil) of the drive source can be reduced, a simple and small configuration can be provided. In addition, since the coil 31 is separated from the vibration system of the optical scanner 1, adverse effects of the heat generation of the coil 31 on the vibration system can be suppressed.

The behavior of the movable mirror portion 11 is detected based on detection signals of the strain detection elements 51 and 52.

Hereinafter, the strain detection elements 51 and 52 will be described in detail.

Figure 6:
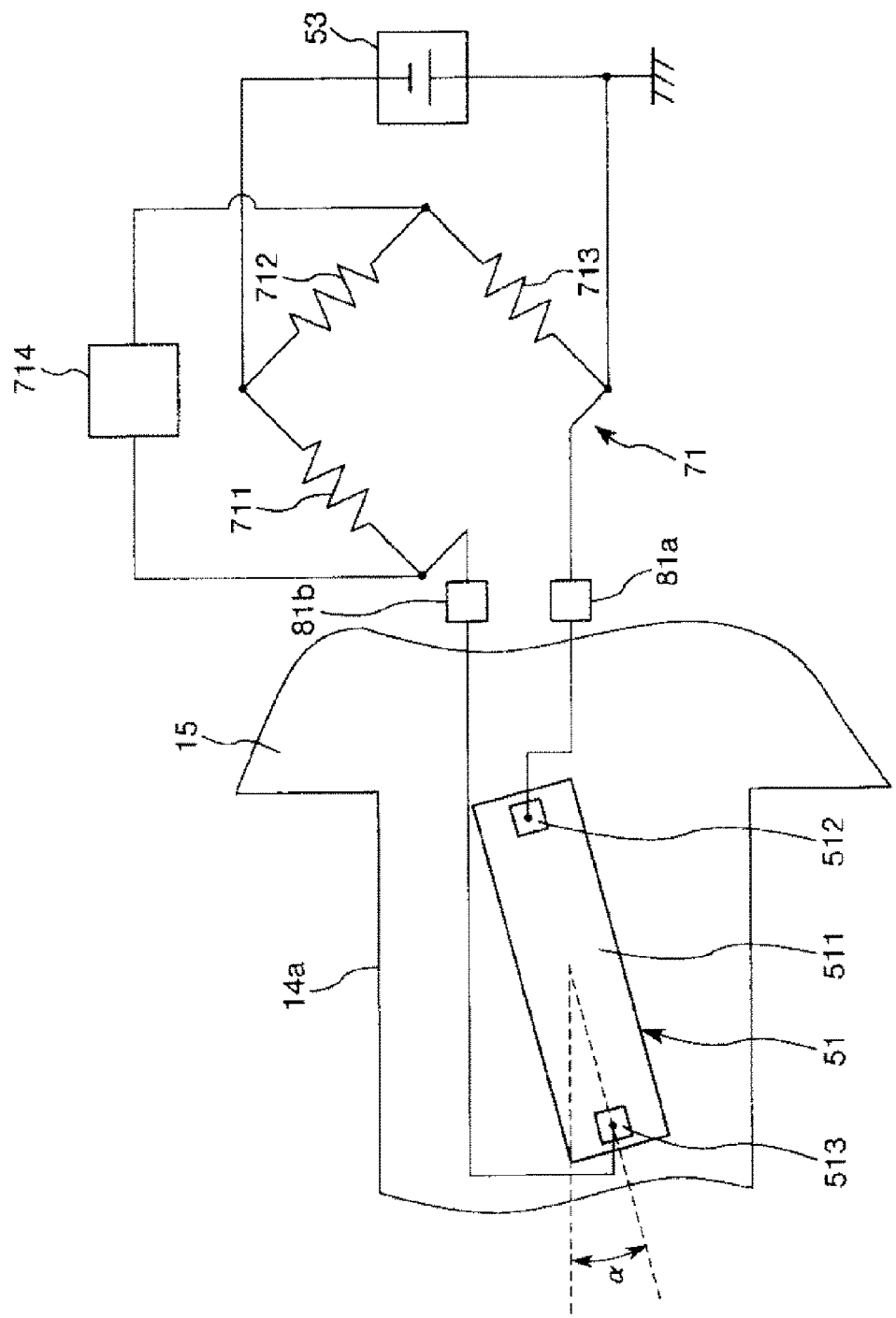
FIG. 6 is a diagram for illustrating a strain detection element of the optical scanner shown in FIG. 1.
Figure 7:
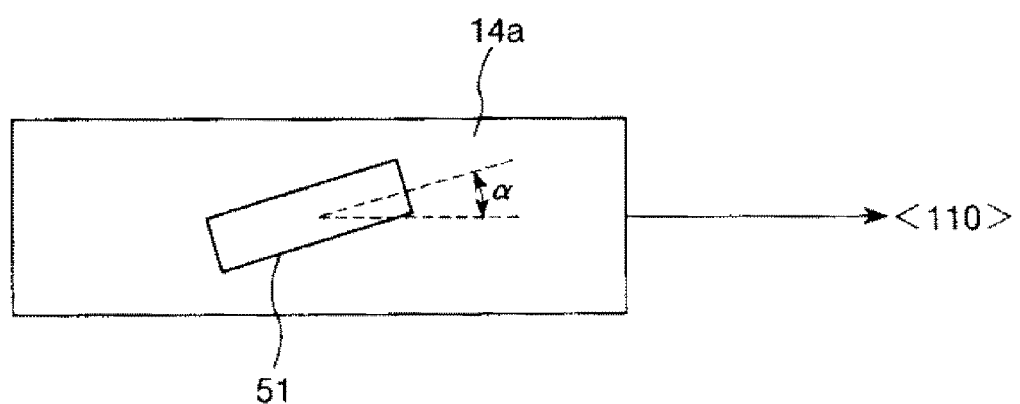
FIG. 7 is a diagram for illustrating the relationship between a posture of a two-terminal-type strain detection element and a crystal orientation of silicon.
Figure 8A:
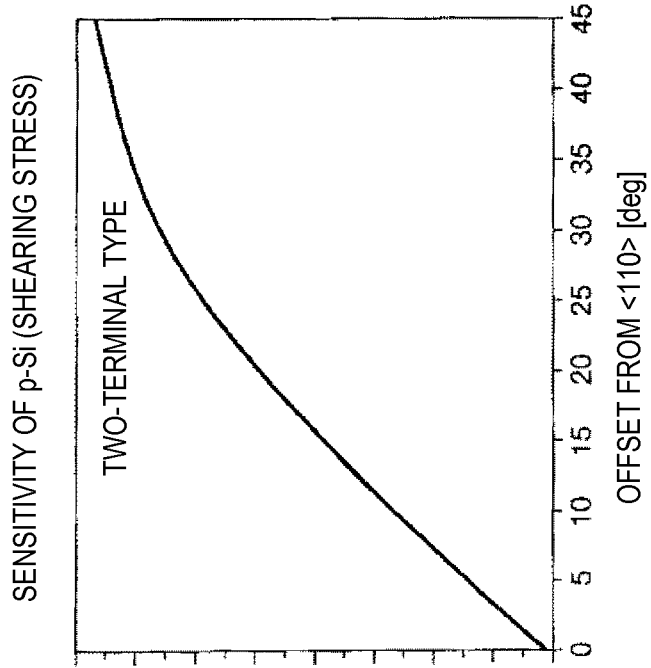
FIGS. 8A and 8B are graphs showing the relationships between a posture (an angle $\alpha$) of the two-terminal-type strain detection element and absolute values of rates of variation in the resistance value due to tensile stress and shearing stress when p-type silicon is used in a piezoresistive region.
Figure 8B:
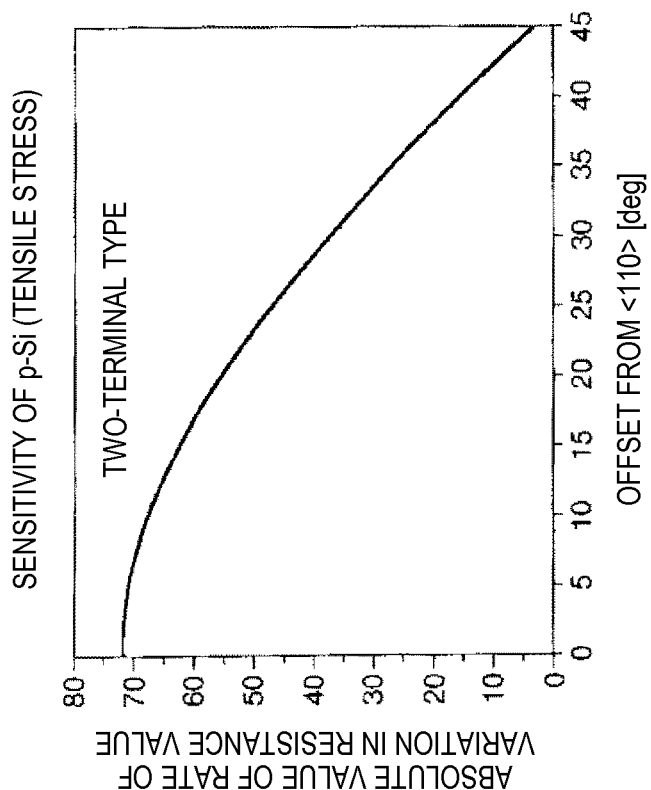
Figures 9A, 9B:
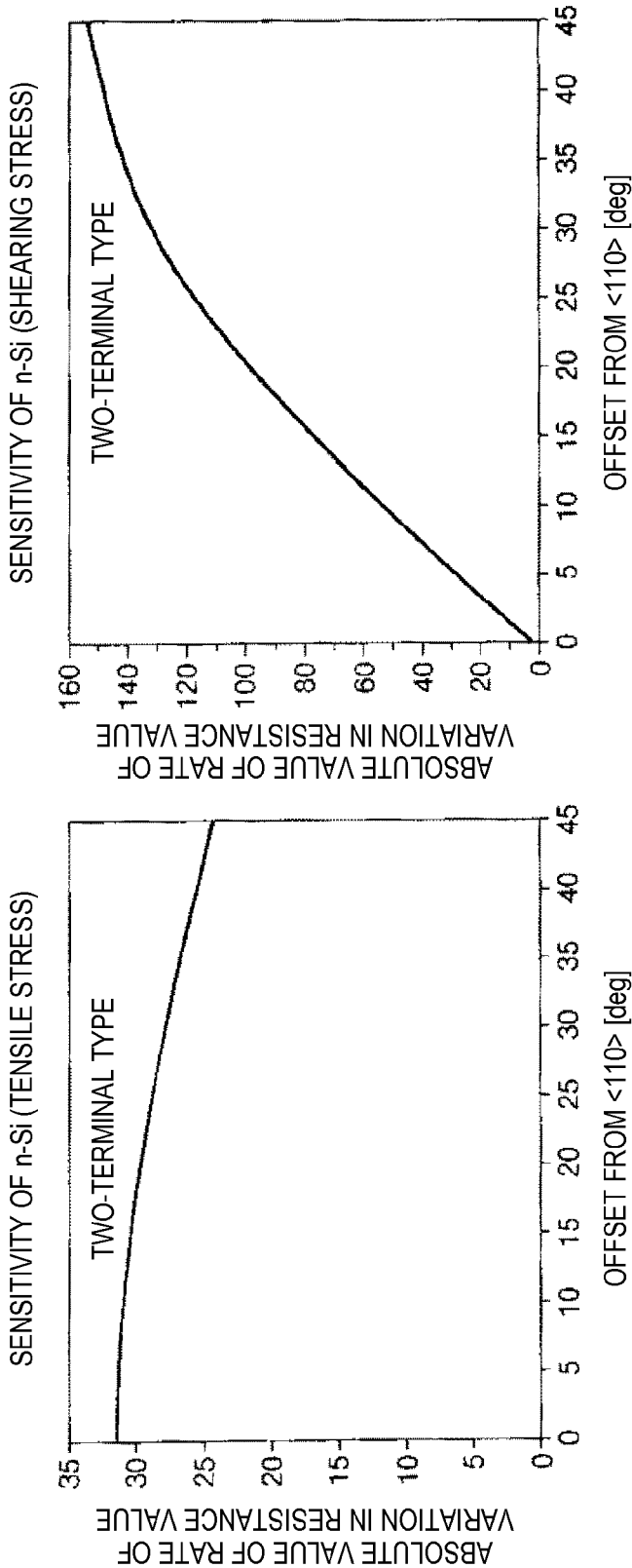
FIGS. 9A and 9B are graphs showing the relationships between a posture (an angle $\alpha$) of the two-terminal-type strain detection element and absolute values of rates of variation in the resistance value due to tensile stress and shearing stress when n-type silicon is used in the piezoresistive region.
Figures 10A, 10B:
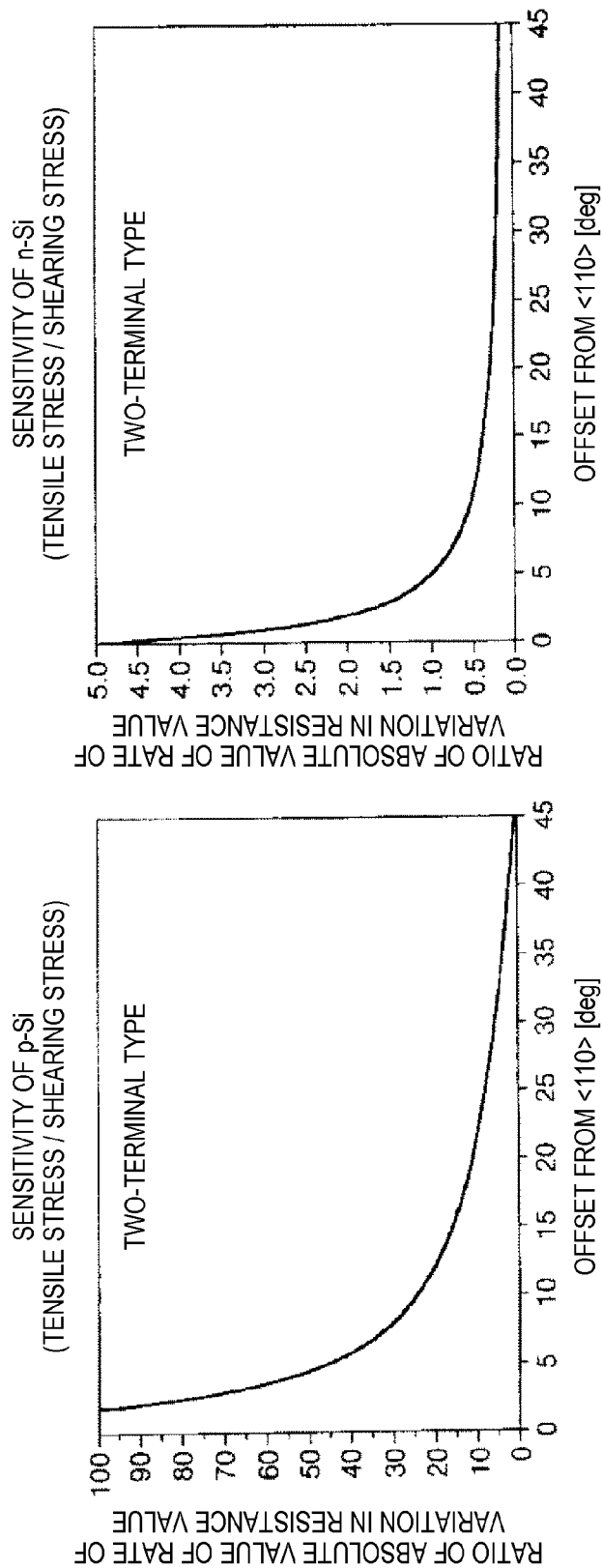
FIGS. 10A and 10B are graphs showing the relationships between a posture (an angle $\alpha$) of the two-terminal-type strain detection element and ratios of the absolute values of the rates of variation in the resistance value due to tensile stress and shearing stress.

FIG. 6 is a diagram for illustrating the strain detection element of the optical scanner shown in FIG. 1. FIG. 7 is a diagram for illustrating the relationship between a posture of a two-terminal-type strain detection element and a crystal orientation of silicon. FIGS. 8A and 8B are graphs showing the relationships between a posture (an angle α) of the two-terminal-type strain detection element and absolute values of rates of variation in the resistance value due to tensile stress and shearing stress when p-type silicon is used in a piezoresistive region. FIGS. 9A and 9B are graphs showing the relationships between a posture (an angle α) of the two-terminal-type strain detection element and absolute values of rates of variation in the resistance value due to tensile stress and shearing stress when n-type silicon is used in the piezoresistive region. FIGS. 10A and 10B are graphs showing the relationships between a posture (an angle α) of the two-terminal-type strain detection element and ratios of the absolute values of the rates of variation in the resistance value due to tensile stress and shearing stress.

The strain detection element 51 (the first strain detection element) is disposed in the shaft portion 14a to detect the deformation (bending deformation and torsional deformation) of the shaft portion 14a. The strain detection element 52 (the second strain detection element) is disposed in the shaft portion 14b to detect the deformation (bending deformation and torsional deformation) of the shaft portion 14b.

The strain detection elements 51 and 52 are disposed to be symmetric with respect to the Y-axis when viewed from above. Hereinafter, the strain detection element 51 will be mainly described, and since the strain detection element 52 is the same as the strain detection element 51, the description thereof will be omitted.

In this embodiment, the strain detection element 51 is disposed at an end portion of the shaft portion 14a on the side of the fixed portion 15. Accordingly, when wiring connected to the strain detection element 51 is drawn out to the fixed portion 15, a portion where the wiring is disposed in the shaft portion 14a can be reduced.

The strain detection element 51 is a two-terminal-type piezoresistor element.

Specifically, as shown in FIG. 6, the strain detection element 51 has a piezoresistive region 511 and a pair of terminals 512 and 513 that is disposed on the piezoresistive region 511.

The piezoresistive region 511 is formed by doping impurities into a surface of the shaft portion 14a. More specifically, when the shaft portion 14a is formed by processing a p-type silicon single crystal substrate, the piezoresistive region 511 is n-type silicon single crystal (an n-type resistive region) formed by doping impurities such as phosphorus into the surface of the shaft portion 14a. On the other hand, when the shaft portion 14a is formed by processing an n-type silicon single crystal substrate, the piezoresistive region 511 is p-type silicon single crystal (a p-type resistive region) formed by doping impurities such as boron into the surface of the shaft portion 14a.

The piezoresistive region 511 has a longitudinal shape extending in a direction inclined with respect to the longitudinal direction (that is, the X-axis direction) of the shaft portion 14a. In addition, the piezoresistive region 511 is disposed across the center in a width direction of the shaft portion 14a when viewed from above.

In this embodiment, the whole piezoresistive region 511 is provided on the shaft portion 14a. The position of the piezoresistive region 511 is not limited to the position shown in the drawing as long as it can receive tensile stress or compressive stress caused by the bending deformation of the shaft portion 14a and can receive shearing stress caused by the torsional deformation of the shaft portion 14a. For example, the piezoresistive region 511 may be provided across a boundary portion between the shaft portion 14a and the fixed portion 15.

The pair of terminals 512 and 513 is disposed side by side in the direction inclined with respect to the longitudinal direction (that is, the X-axis direction) of the shaft portion 14a on the piezoresistive region 511.

In this embodiment, the pair of terminals 512 and 513 is disposed at both end portions in the longitudinal direction of the piezoresistive region 511.

The pair of terminals 512 and 513 is electrically connected to the first signal processing circuit 71. Although not shown in FIG. 6, the pair of terminals 512 and 513 is also electrically connected to the second signal processing circuit 72 shown in FIG. 3.

In the strain detection element 51, when tensile stress or compressive stress is caused in the piezoresistive region 511 along with the bending deformation of the shaft portion 14a, the specific resistance value of the piezoresistive region 511 varies according to the degree of the tensile stress or the compressive stress.

In the strain detection element 51, when shearing stress is caused in the piezoresistive region 511 along with the torsional deformation of the shaft portion 14a, the specific resistance value of the piezoresistive region 511 varies according to the degree of the shearing stress.

Accordingly, the detection signals of the strain detection element 51 include signals based on the bending deformation and the torsional deformation of the shaft portion 14a.

In this embodiment, since the pair of terminals 512 and 513 is disposed side by side in the direction inclined with respect to the X-axis direction on the piezoresistive region 511, the signals based on the bending deformation and the torsional deformation of the shaft portion 14a that are included in the signals output from the strain detection element 51 can be increased.

A ratio between the signal based on the bending deformation of the shaft portion 14a and the signal based on the torsional deformation of the shaft portion 14a, included in the detection signals of the strain detection element 51, varies according to the angle α (the inclination angle) of the strain detection element 51. Here, the angle α is an angle formed between the longitudinal direction (that is, the X-axis direction) of the shaft portion 14a and the direction in which the pair of terminals 512 and 513 is provided side by side (the direction of the straight line connecting the pair of terminals 512 and 513 at the shortest distance).

Hereinafter, regarding the detection signals of the strain detection element 51, an exemplary case in which the longitudinal direction of the shaft portion 14a matches a <110> direction of the crystal axis of silicon single crystal as shown in FIG. 7 will be described in detail.

When the piezoresistive region 511 is made of p-type silicon single crystal, the absolute value of the rate of variation in the resistance value related to the tensile stress of the piezoresistive region 511 between the pair of terminals 512 and 513 is reduced with an increase in the angle α (offset from <110>) as shown in FIG. 8A. That is, the larger the angle α, the smaller the signal based on the bending deformation of the shaft portion 14a that is included in the detection signals of the strain detection element 51.

In this case, the absolute value of the rate of variation in the resistance value related to the shearing stress of the piezoresistive region 511 between the pair of terminals 512 and 513 is increased with an increase in the angle α as shown in FIG. 8B. That is, the larger the angle α, the larger the signal based on the torsional deformation of the shaft portion 14a that is included in the detection signals of the strain detection element 51. The variation of the signal based on the torsional deformation with the angle α is smaller than the variation of the signal based on the bending deformation with the angle α.

In addition, when the piezoresistive region 511 is made of n-type silicon single crystal, the absolute value of the rate of variation in the resistance value related to the tensile stress of the piezoresistive region 511 between the pair of terminals 512 and 513 is reduced with an increase in the angle α as shown in FIG. 9A. That is, the larger the angle α, the smaller the signal based on the bending deformation of the shaft portion 14a that is included in the detection signals of the strain detection element 51. The variation of the signal based on the bending deformation with the angle α is small.

In this case, the absolute value of the rate of variation in the resistance value related to the shearing stress of the piezoresistive region 511 between the pair of terminals 512 and 513 is increased with an increase in the angle α as shown in FIG. 9B. That is, the larger the angle α, the larger the signal based on the torsional deformation of the shaft portion 14a that is included in the detection signals of the strain detection element 51. The variation of the signal based on the torsional deformation with the angle α is larger than the variation of the signal based on the bending deformation with the angle α.

In addition, when the piezoresistive region 511 is made of p-type silicon single crystal, a ratio (R1/R2) of the absolute value (R1) of the rate of variation in the resistance value related to the tensile stress of the piezoresistive region 511 between the pair of terminals 512 and 513 to the absolute value (R2) of the rate of variation in the resistance value related to the shearing stress is reduced with an increase in the angle α as shown in FIG. 10A. That is, the larger the angle α, the smaller the ratio of the signal based on the bending deformation to the signal based on the torsional deformation of the shaft portion 14a, included in the detection signals of the strain detection element 51.

In addition, when the piezoresistive region 511 is made of n-type silicon single crystal, a ratio (R1/R2) of the absolute value (R1) of the rate of variation in the resistance value related to the tensile stress of the piezoresistive region 511 between the pair of terminals 512 and 513 to the absolute value (R2) of the rate of variation in the resistance value related to the shearing stress is reduced with an increase in the angle α as shown in FIG. 10B. That is, the larger the angle α, the smaller the ratio of the signal based on the bending deformation to the signal based on the torsional deformation of the shaft portion 14a, included in the detection signals of the strain detection element 51. The ratio is reduced regardless of the angle α and a variation thereof with the angle α is also small.

From the above description, in a case in which the longitudinal direction of the shaft portion 14a matches a <110> direction of the crystal axis of silicon single crystal, when the piezoresistive region 511 is made of p-type silicon single crystal, signals based on the bending deformation and the torsional deformation of the shaft portions 14a that are included in signals output from the strain detection element 51 can be efficiently increased.

The angle α varies with a conductivity type and a crystal axis direction of the silicon single crystal constituting the shaft portions 14a and 14b, and is not particularly limited.

For example, when the longitudinal directions of the shaft portions 14a and 14b match a <110> direction of the crystal axis of the silicon single crystal and the piezoresistive region 511 is made of p-type silicon single crystal, the angle α is preferably 3° to 25°, and more preferably 5° to 8°. As shown in FIG. 10A, the above-described ratio (R1/R2) can be adjusted in a range of about 10% to 90% by adjusting the angle α to 3° to 25°. In addition, the above-described ratio (R1/R2) can be adjusted in a range of about 40% to 60% by adjusting the angle α to 5° to 8°.

The detection signals of the strain detection element 51 are input to the first signal processing circuit 71 (a first signal processing portion) and the second signal processing circuit 72 (a second signal processing portion) via a pair of terminals 81a and 81b provided in the fixed portion 15 (see FIG. 3). The detection signals of the strain detection element 52 are input to the first signal processing circuit 71 and the second signal processing circuit 72 via a pair of terminals 82a and 82b provided in the fixed portion 15.

The first signal processing circuit 71 has a function of converting detection signals of the strain detection elements 51 and 52 into signals appropriate for signal processing through a predetermined process.

Specific examples of the process in the first signal processing circuit 71 include impedance conversion, temperature compensation, signal amplification, processing using a filter, and processing using an AD converter.

As described above, the detection signals of the strain detection elements 51 and 52 include signals based on the bending deformation and the torsional deformation of the shaft portions 14a and 14b. If necessary, the first signal processing circuit 71 performs the above-described process to remove signals based on the torsional deformation of the shaft portions 14a and 14b from the detection signals of the strain detection elements 51 and 52 and to output signals based on the bending deformation of the shaft portions 14a and 14b. Accordingly, the behavior of the movable mirror portion 11 around the Y-axis can be detected based on the signals output from the first signal processing circuit 71.

In this embodiment, the first signal processing circuit 71 has resistor elements 711, 712, and 713 and a processing portion 714 as shown in FIG. 6.

The resistor elements 711, 712, and 713 and the strain detection element 51 configure a bridge circuit (a Wheatstone bridge circuit). The bridge circuit is supplied with electric power from a strain detection element drive circuit 53, and outputs a signal (a voltage) corresponding to the variation in the resistance value of the strain detection element 51 to the processing portion 714.

Each of the resistor elements 711, 712, and 713 preferably has the same temperature characteristics as the strain detection element 51. Accordingly, a signal (a voltage) corresponding to the amount of the bending deformation of the shaft portion 14a can be stably output regardless of the temperature characteristics of the strain detection element 51.

The resistor elements 711, 712, and 713 may be disposed in the fixed portion 15 at positions where stress accompanying deformation of the shaft portions 14a and 14b is not received. In this case, each of the resistor elements 711, 712, and 713 can be configured to include a resistive region configured in the same manner as the piezoresistive region of the strain detection element 51 and a pair of terminals provided in the resistive region. In addition, in this case, each of the resistor elements 711, 712, and 713 is preferably disposed at a position of which the temperature condition is the same as that of the strain detection element 51.

The processing portion 714 removes a component based on the torsional deformation of the shaft portion 14a from a signal (a voltage) from the above-described bridge circuit including the strain detection element 51.

For example, the processing portion 714 is a differential amplification circuit, and amplifies a difference between a signal (a voltage) from the bridge circuit including the strain detection element 51 and a signal (a voltage) from a bridge circuit that is configured in the same manner as the above bridge circuit and includes the strain detection element 52. Accordingly, the torsional deformation component included in the signals from the bridge circuits can be removed and the bending deformation component can be amplified.

In this manner, from the detection signals of the pair of strain detection elements 51 and 52 disposed in the pair of shaft portions 14a and 14b with the frame body portion 13 interposed therebetween, signals based on the bending deformation of the shaft portions 14a and 14b can be efficiently extracted.

The signals output from the first signal processing circuit 71 are input to the control portion 6 shown in FIG. 3.

The second signal processing circuit 72 has a function of converting detection signals of the strain detection elements 51 and 52 into signals appropriate for signal processing through a predetermined process.

Specific examples of the process in the second signal processing circuit 72 include impedance conversion, temperature compensation, signal amplification, processing using a filter, and processing using an AD converter.

As described above, the detection signals of the strain detection elements 51 and 52 include signals based on the bending deformation and the torsional deformation of the shaft portions 14a and 14b. If necessary, the second signal processing circuit 72 performs the above-described process to remove signals based on the bending deformation of the shaft portions 14a and 14b from the detection signals of the strain detection elements 51 and 52 and to output signals based on the torsional deformation of the shaft portions 14a and 14b. Accordingly, the behavior of the movable mirror portion 11 around the X-axis can be detected based on the signals output from the second signal processing circuit 72.

For example, the second signal processing circuit 72 includes a differential amplification circuit, and amplifies the sum of a signal (a voltage) from the above-described bridge circuit including the strain detection element 51 and a signal (a voltage) from the bridge circuit that is configured in the same manner as the above bridge circuit and includes the strain detection element 52. Accordingly, the bending deformation component included in the signals from the bridge circuits can be removed and the torsional deformation component can be amplified.

In this manner, from the detection signals of the pair of strain detection elements 51 and 52 disposed in the pair of shaft portions 14a and 14b with the frame body portion 13 interposed therebetween, signals based on the torsional deformation of the shaft portions 14a and 14b can be efficiently extracted.

The signal output from the second signal processing circuit 72 is input to the control portion 6 shown in FIG. 3.

In the control portion 6, the behavior of the movable mirror portion 11 around the Y-axis is detected based on the signal output from the first signal processing circuit 71. Accordingly, based on the detected behavior, the behavior of the movable mirror portion 11 around the Y-axis can be controlled to be turned into a desired state, or the behavior of the movable mirror portion 11 around the Y-axis and operations of other devices can be synchronized with each other.

In the control portion 6, the behavior of the movable mirror portion 11 around the X-axis is detected based on the signal output from the second signal processing circuit 72. Accordingly, based on the detected behavior, the behavior of the movable mirror portion 11 around the X-axis can be controlled to be turned into a desired state, or the behavior of the movable mirror portion 11 around the X-axis and operations of other devices can be synchronized with each other.

In this embodiment, as shown in FIG. 3, the control portion 6 has an H-detection portion 61, a V-detection portion 62, an H-control portion 63, a V-control portion 64, an H-target value storage portion 65, and a V-target value generation portion 66.

The H-detection portion 61 generates, for example, a signal corresponding to a swing angle of the movable mirror portion 11 around the Y-axis as a signal necessary for control of horizontal scanning, based on the signal output from the first signal processing circuit 71. The method of detecting the swing angle of the movable mirror portion 11 around the Y-axis will be described later in detail.

The V-detection portion 62 generates, for example, a signal corresponding to a swing angle of the movable mirror portion 11 around the X-axis as a signal necessary for control of horizontal scanning, based on the signal output from the second signal processing circuit 72.

The H-control portion 63 generates a drive signal for horizontal scanning based on the H-target value stored in advance in the H-target value storage portion 65 and the signal output from the H-detection portion 61.

The H-target value storage portion 65 stores, as H-target values, for example, a difference in phase from the drive signal for horizontal scanning and a maximum swing angle of the movable mirror portion 11 around the Y-axis.

The V-control portion 64 generates a drive signal for vertical scanning based on the V-target value output from the V-target value generation portion 66 and the signal output from the V-detection portion 62.

The V-target value generation portion 66 generates, as V-target values, for example, a difference in phase from the drive signal for vertical scanning and a maximum swing angle of the movable mirror portion 11 around the X-axis based on line information in a vertical scanning direction input from the outside.

Here, regarding the method of detecting the behavior of the movable mirror portion 11 around the Y-axis using the detection signals of the strain detection elements 51 and 52, an exemplary case in which the swing angle of the movable mirror portion 11 around the Y-axis is detected will be described.

First Detection Method

In a first detection method, an observer is used to estimate the behavior (in this example, the swing angle) of the movable mirror portion 11 around the Y-axis based on the signal output from the first signal processing circuit 71.

Hereinafter, the first detection method will be described in detail.

As described above, the optical scanner 1 superimposes and applies a first voltage for horizontal scanning and a second voltage for vertical scanning to the coil 31, and thus swings the movable mirror portion 11 around the Y-axis (the first axis) at the frequency of the first voltage and around the X-axis (the second axis) at the frequency of the second voltage.

Here, since the frequency (the drive frequency of the horizontal scanning) of the first voltage and the frequency (the drive frequency of the vertical scanning) of the second voltage are sufficiently separated from each other, crosstalk between torque caused by the first voltage and torque caused by the second voltage may not be considered. Accordingly, the motion around the X-axis and the motion around the Y-axis of the optical scanner 1 can be considered independently of each other.

An equation related to the motion of the optical scanner 1 around the Y-axis can be expressed as the following expression (1).

$$\begin{cases} I_{hh}\ddot{\theta}_{hh} + c_{hh}(\dot{\theta}_{hh} - \dot{\theta}_{vh}) + k_{hh}(\theta_{hh} - \theta_{vh}) = 0 \\ I_{vh}\ddot{\theta}_{vh} + c_{vh}\dot{\theta}_{vh} - c_{hh}(\dot{\theta}_{hh} - \dot{\theta}_{vh}) + k_{vh}\theta_{vh} - k_{hh}(\theta_{hh} - \theta_{vh}) = T(t) \end{cases} \quad (1)$$

In the expression (1), $\theta_{hh}$ represents a swing angle of the movable mirror portion 11 around the Y-axis, $\theta_{vh}$ represents a swing angle of the frame body portion 13 around the Y-axis, $I_{hh}$ represents inertia of the movable mirror portion 11 around the Y-axis, $I_{vh}$ represents inertia of the frame body portion 13 around the Y-axis, $C_{hh}$ represents a damping coefficient of the swing (the vibration) of the movable mirror portion 11 around the Y-axis, $C_{vh}$ represents a damping coefficient of the swing (the vibration) of the frame body portion 13 around the Y-axis, $k_{hh}$ represents a torsional spring constant of the shaft portions 12a and 12b around the Y-axis, $k_{vh}$ represents a torsional spring constant of the shaft portions 14a and 14b around the Y-axis, and T(t) represents torque around the Y-axis that is received by the frame body portion 13 by the interaction of the magnetic fields of the permanent magnet 21 and the coil 31.

In addition, when X is defined as follows:

$$X = \begin{bmatrix} \theta_{hh} \\ \theta_{vh} \\ \dot{\theta}_{hh} \\ \dot{\theta}_{vh} \end{bmatrix},$$

the output (a bending component) of the detection signals of the strain detection elements 51 and 52 related to the bending stress of the shaft portions 14a and 14b is represented by y, and the conversion coefficient of the strain detection elements 51 and 52 is represented by $\alpha$, the following relationship between X and y can be derived from the expression (1):

$$\dot{X} = AX + BU$$

$$y = CX$$

-continued $$A = \begin{bmatrix} 0 & 0 & 1 & 0 \\ 0 & 0 & 0 & 1 \\ -\frac{k_{hh}}{I_{hh}} & \frac{k_{vh}}{I_{hh}} & -\frac{c_{hh}}{I_{hh}} & \frac{c_{vh}}{I_{hh}} \\ \frac{k_{hh}}{I_{vh}} & -\frac{k_{vh}}{I_{vh}} & \frac{c_{hh}}{I_{vh}} & -\frac{c_{vh}}{I_{vh}} \end{bmatrix},$$

$$B = \begin{bmatrix} 0 \\ 0 \\ 0 \\ \frac{1}{I_{vh}} \end{bmatrix},$$

$$C = \begin{bmatrix} 0 & \alpha & 0 & 0 \end{bmatrix}$$

When an observability coefficient of the system that is derived from the relationship between X and y is defined as follows:

$$M_{obs} = \begin{bmatrix} C_1 \\ C_1 A_1 \\ C_1 A_1^1 \\ C_1 A_1^3 \end{bmatrix},$$

the following expression is obtained.

$$M_{obs} = \begin{bmatrix} 0 & 1 & 0 & 0 \\ 0 & 0 & 0 & 1 \\ \frac{k_{11}}{I_{21}} & -\frac{k_{21}}{I_{21}} & \frac{c_{21}}{I_{21}} & -\frac{c_{21}}{I_{21}} \\ \frac{c_{11}k_{11}}{I_{11}I_{21}} - \frac{c_{21}k_{11}}{I_{21}^2} & \frac{c_{11}k_{21}}{I_{11}I_{21}} + \frac{c_{21}k_{21}}{I_{21}^2} & -\frac{c_{11}^2}{I_{11}I_{21}} + \frac{k_{11}}{I_{21}} - \frac{c_{11}c_{21}}{I_{21}^2} & \frac{c_{11}c_{21}}{I_{11}I_{21}} - \frac{k_{21}}{I_{21}} + \frac{c_{21}^2}{I_{21}^2} \end{bmatrix}$$

Here, the system is observable because of $M_{obs}=4$. Accordingly, based on the signals based on the bending deformation of the shaft portions 14a and 14b that are included in the detection signals of the strain detection elements 51 and 52 disposed in the shaft portions 14a and 14b, the swing angle (the vibration angle) of the movable mirror portion 11 around the Y-axis can be estimated using the observer.

The observer has an observer gain represented by L and the relationship between estimated values of X and y is expressed as follows.

$$\dot{\hat{X}} = A\hat{X} + BU - L(\hat{y} - y)$$

$$\hat{y} = C\hat{X}$$

(where, $\hat{X}$=(estimated value of X) and $\hat{y}$=(estimated value of y)

Using the relationship between the estimated values of X and y, the swing angle of the movable mirror portion 11 around the Y-axis can be estimated based on the signals based on the bending deformation of the shaft portions 14a and 14b that are included in the detection signals of the strain detection elements 51 and 52.

According to the above-described first detection method, the behavior of the movable mirror portion 11 around the Y-axis can be detected based on the signal output from the first signal processing circuit 71 even when the movable mirror portion 11 is swung around the Y-axis in a non-resonant state.

Second Detection Method

In a second detection method, a ratio between an amplitude at a resonance frequency related to the swinging of the movable mirror portion 11 around the Y-axis and an amplitude at a resonance frequency related to the swinging of the frame body portion 13 around the Y-axis is used to estimate the behavior (in this example, the swing angle) of the movable mirror portion 11 around the Y-axis based on the signal output from the first signal processing circuit 71.

Hereinafter, the second detection method will be described in detail.

In the above expression (1), when Laplace transform of $\theta_{hh}$ and $\theta_{vh}$ is represented by $X_{hh}$ and $X_{vh}$, respectively, and all initial values thereof are 0, the following expression (2) is obtained:

$$\begin{cases} (I_{hh}s^2 + c_{hh}s + k_{hh})X_{hh} + (-c_{hh}s - k_{hh})X_{vh} = 0 \\ (-c_{hh}^s - k_{hh})X_{hh} + \{I_{vh}s^2 + (c_{vh} + c_{hh})s + (k_{vh} + k_{hh})\}X_{vh} = \text{laplace}[T(t)] \end{cases} \quad (2)$$

When deforming this expression (2), the following expression (3) is obtained:

$$\begin{cases} \begin{bmatrix} X_{hh} \\ X_{vh} \end{bmatrix} = \\ \frac{1}{(I_{hh}s^2 + c_{hh}s + k_{hh}) * \{I_{vh}s^2 + (c_{vh} + c_{hh})s + (k_{vh} + k_{hh})\} - (c_{hh}s + k_{hh})^2} \begin{bmatrix} c_{hh}s + k_{hh} \\ I_{hh}s^2 + c_{hh}s + k_{hh} \end{bmatrix} \text{laplace}[T(t)] \end{cases} \quad (3)$$

Here, the resonance frequencies related to the swinging of the movable mirror portion 11 and the frame body portion 13 around the Y-axis are determined depending on s (=jω, ω: angular frequency) when the denominator of the expression (3) becomes minimum. As is obvious from the expression (3), since the denominators of $X_{hh}$ and $X_{vh}$ are the same as each other, the resonance frequency related to the swinging of the movable mirror portion 11 around the Y-axis and the resonance frequency related to the swinging of the frame body portion 13 around the Y-axis are equivalent to each other.

Figure 11A:
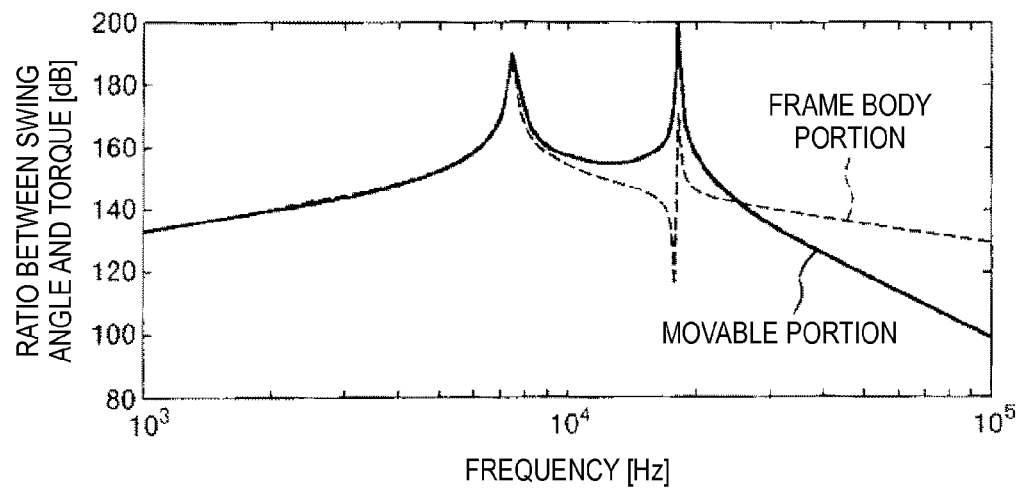
FIG. 11A is a graph showing frequency characteristics related to ratios between the torque around a first axis that is applied to a frame body portion and the swing angles of a movable portion and the frame body portion around the Y-axis.
Figure 12A:
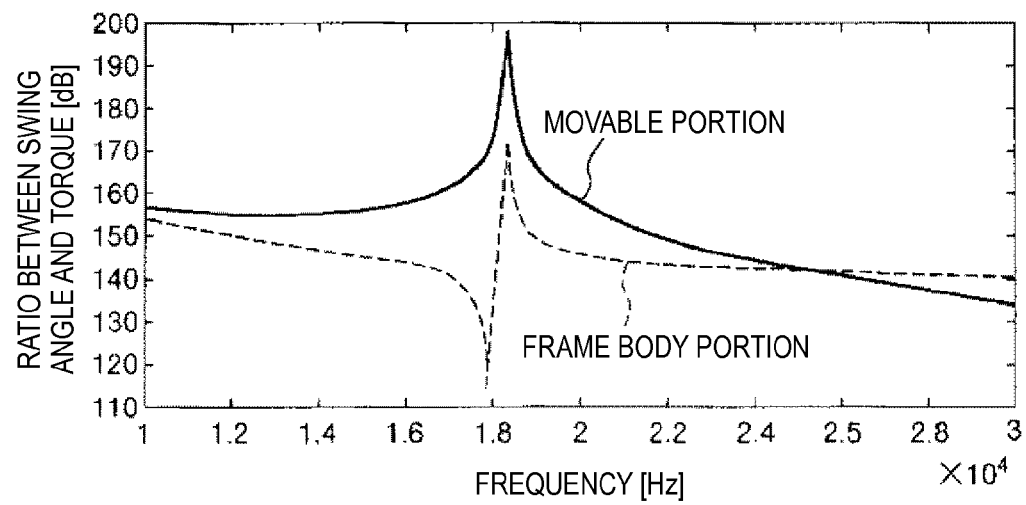
FIG. 12A is a graph obtained by enlarging the vicinity of the resonance frequency of FIG. 11A.

Specifically, frequency characteristics related to ratios between the torque around the Y-axis that is applied to the frame body portion 13 and the swing angles of the movable mirror portion 11 and the frame body portion 13 around the Y-axis are as shown in FIGS. 11A and 12A.

Figure 11B:
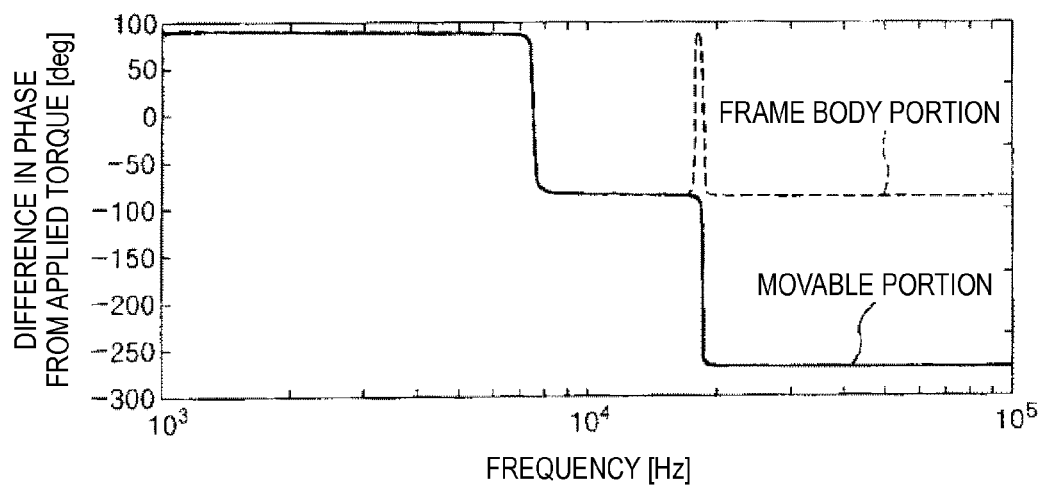
FIG. 11B is a graph showing frequency characteristics related to phase differences between the torque around the first axis that is applied to the frame body portion and the swinging of the movable portion and the frame body portion around the first axis.
Figure 12B:
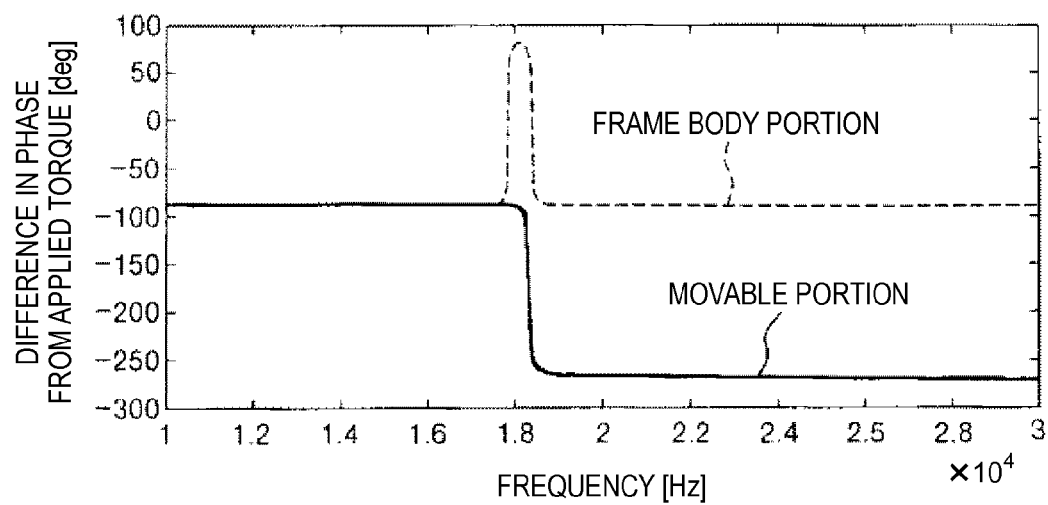
FIG. 12B is a graph obtained by enlarging the vicinity of the resonance frequency of FIG. 11B.

In addition, frequency characteristics related to phase differences between the torque around the Y-axis that is applied to the frame body portion 13 and the swinging of the movable mirror portion 11 and the frame body portion 13 around the Y-axis are as shown in FIGS. 11B and 12B.

FIG. 11A is a graph showing frequency characteristics related to ratios between the torque around the first axis that is applied to the frame body portion and the swing angles of the movable portion and the frame body portion around the Y-axis, and FIG. 11B is a graph showing frequency characteristics related to phase differences between the torque around the first axis that is applied to the frame body portion and the swinging of the movable portion and the frame body portion around the first axis. FIG. 12A is a graph obtained by enlarging the vicinity of the resonance frequency of FIG. 11A, and FIG. 12B is a graph obtained by enlarging the vicinity of the resonance frequency of FIG. 11B.

The swinging of the movable mirror portion 11 and the frame body portion 13 around the Y-axis is expressed as tensile stress of the shaft portions 14a and 14b. Accordingly, whether or not the movable mirror portion 11 is in a resonant state related to the swinging around the Y-axis can be grasped, based on the detection signals of the strain detection elements 51 and 52 disposed in the shaft portions 14a and 14b. More specifically, whether or not the movable mirror portion 11 is in a resonant state related to the swinging around the Y-axis can be grasped, based on the phase differences between the torque around the Y-axis that is applied to the frame body portion 13 and the swinging of the movable mirror portion 11 and the frame body portion 13 around the Y-axis.

To estimate the swing angle (the vibration angle) of the movable mirror portion 11 based on the detection signals of the strain detection elements 51 and 52, the responses of the strain detection elements 51 and 52 may be multiplied by a ratio between the amplitude of the movable mirror portion 11 around the Y-axis and the amplitude of the frame body portion 13 around the Y-axis in the resonant state related to the swinging of the movable mirror portion 11 around the Y-axis.

When the ratio varies according to temperature change, a temperature sensor may be installed in the vicinity of the optical scanner 1 to correct the ratio according to the temperature detected by the temperature sensor.

According to the above-described second detection method, the behavior of the movable mirror portion 11 around the Y-axis can be detected with high accuracy with a relatively simple configuration, based on the signal output from the first signal processing circuit 71.

According to the above-described optical scanner 1, the behaviors of the movable mirror portion 11 around the Y-axis and the X-axis can be detected based on the detection signals of the strain detection elements 51 and 52 disposed in the shaft portions 14a and 14b. Since the strain detection elements 51 and 52 are disposed only in the shaft portions 14a and 14b, the wiring (not shown) connected to the strain detection elements 51 and 52 is not required to be disposed in the shaft portions 12a and 12b or to be disposed over the entire area in the longitudinal direction of the shaft portions 14a and 14b. Therefore, disconnection of the wiring can be suppressed.

Second Embodiment

Next, a second embodiment of the invention will be described.

Figure 13:
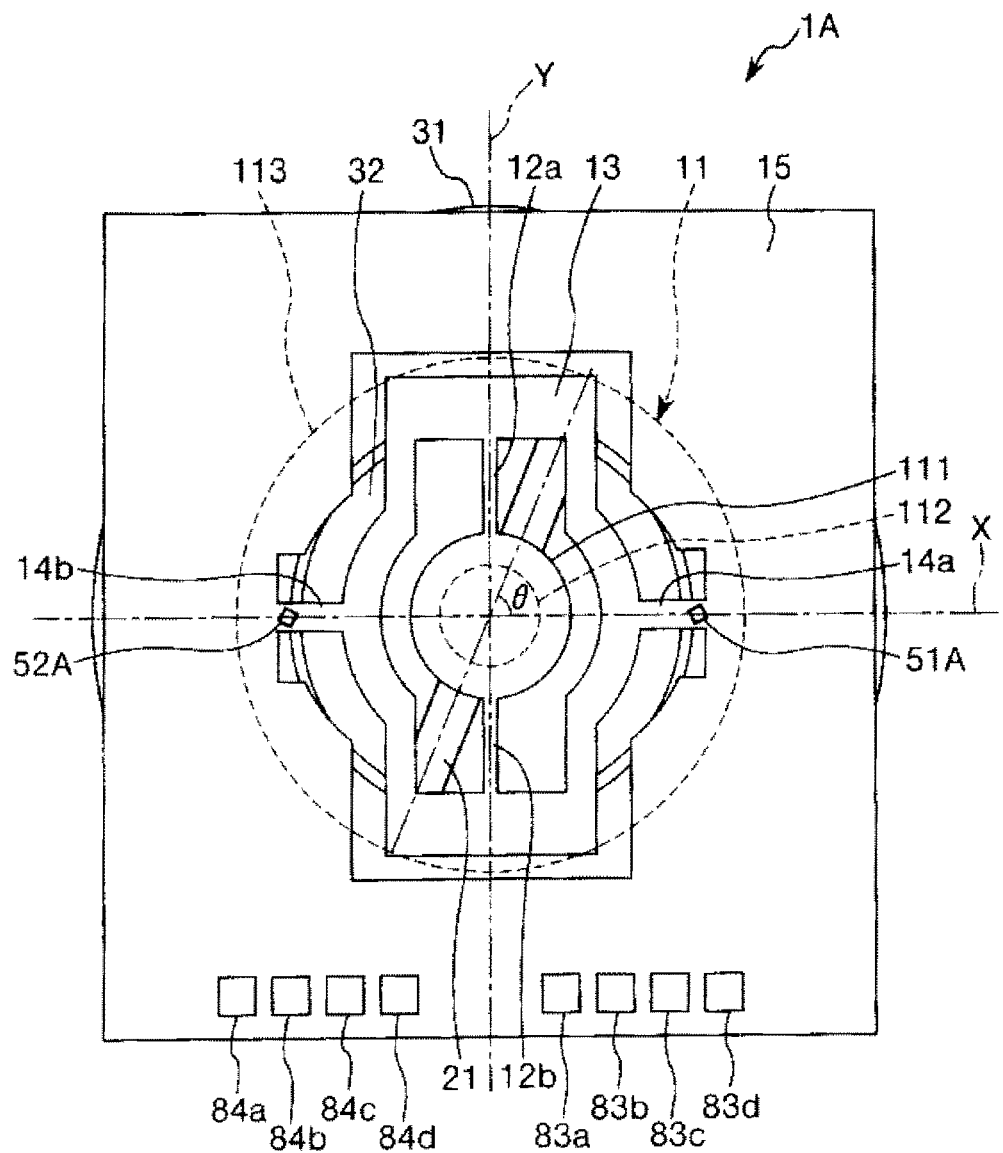
FIG. 13 is a plan view showing an optical scanner according to a second embodiment of the invention.
Figure 14:
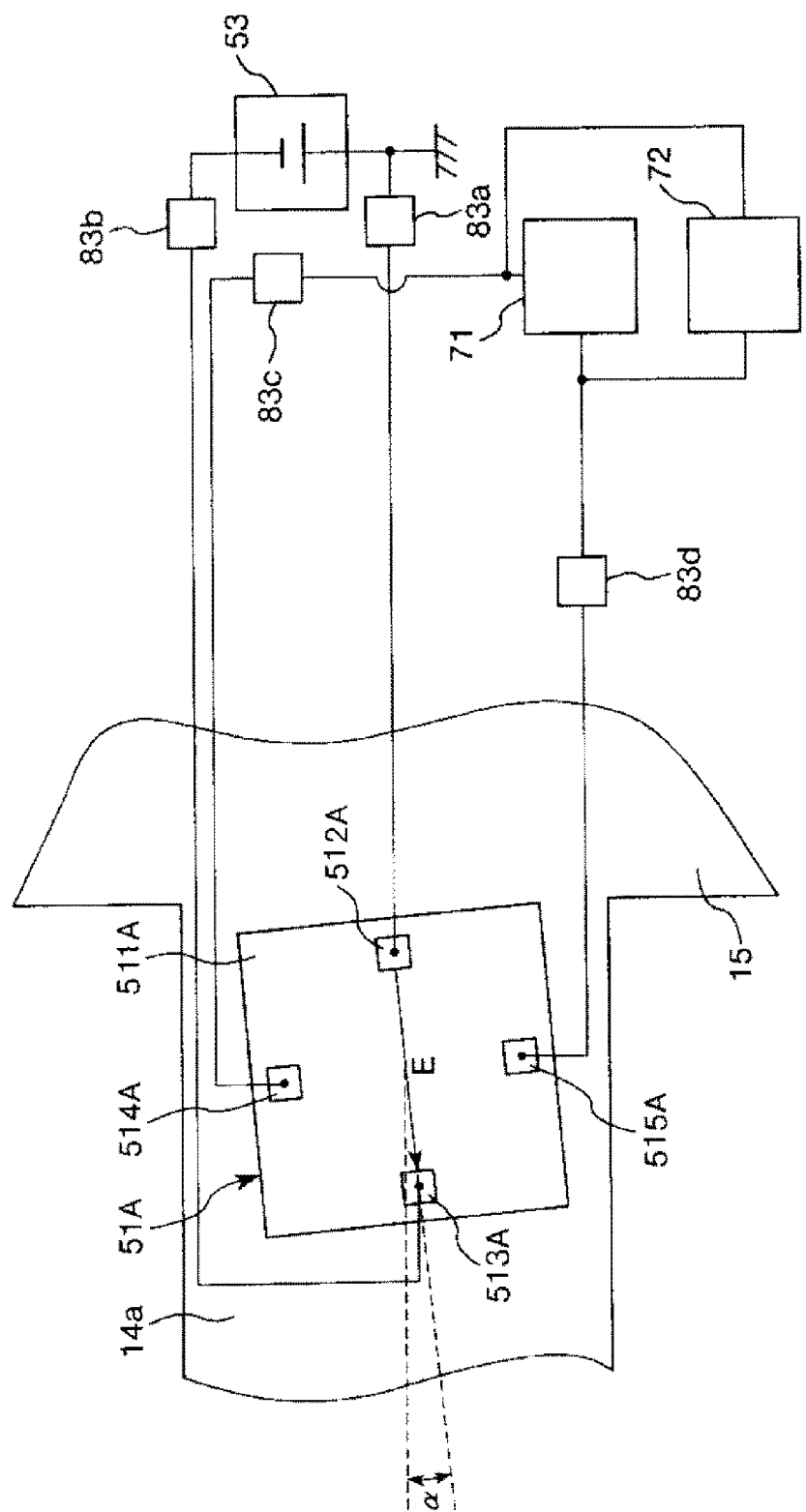
FIG. 14 is a diagram for illustrating a strain detection element of the optical scanner shown in FIG. 13.
Figures 15A, 15B:
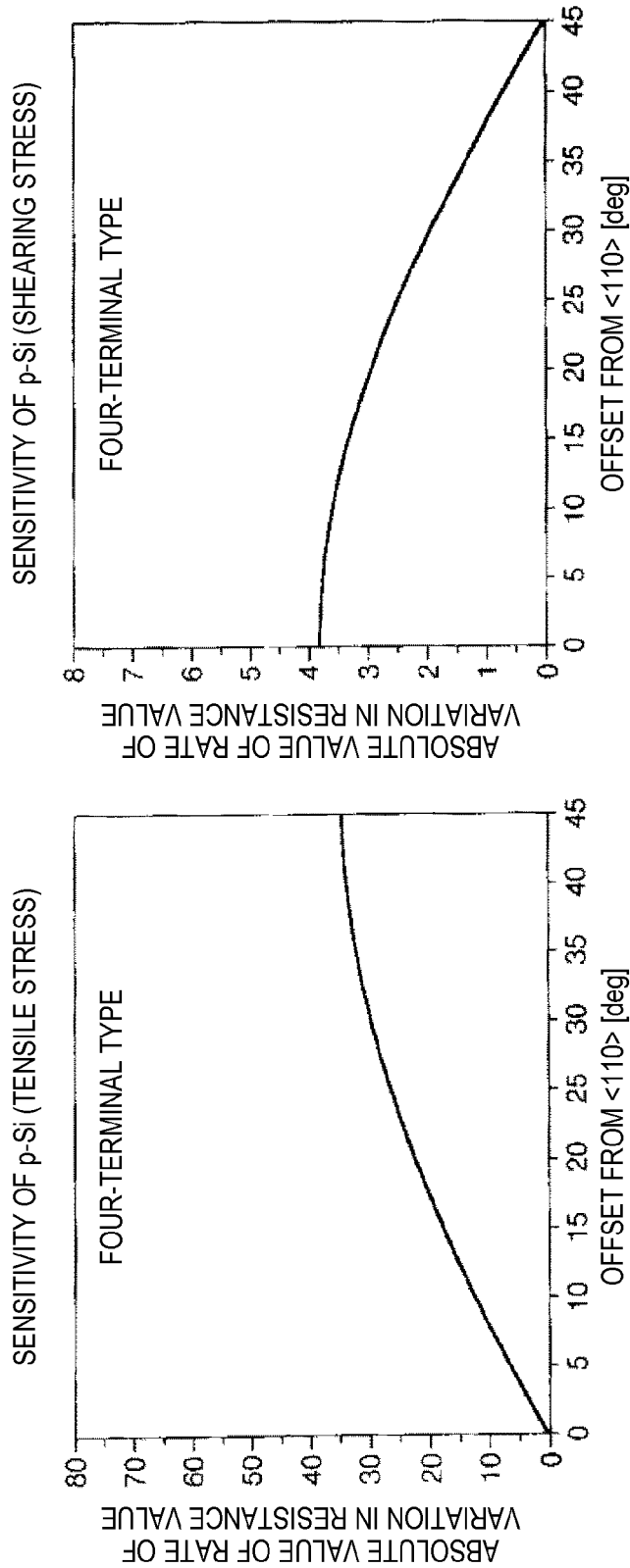
FIGS. 15A and 15B are graphs showing the relationships between a posture (an angle α) of a four-terminal-type strain detection element and absolute values of rates of variation in the resistance value due to tensile stress and shearing stress when p-type silicon is used in a piezoresistive region.
Figures 16A, 16B:
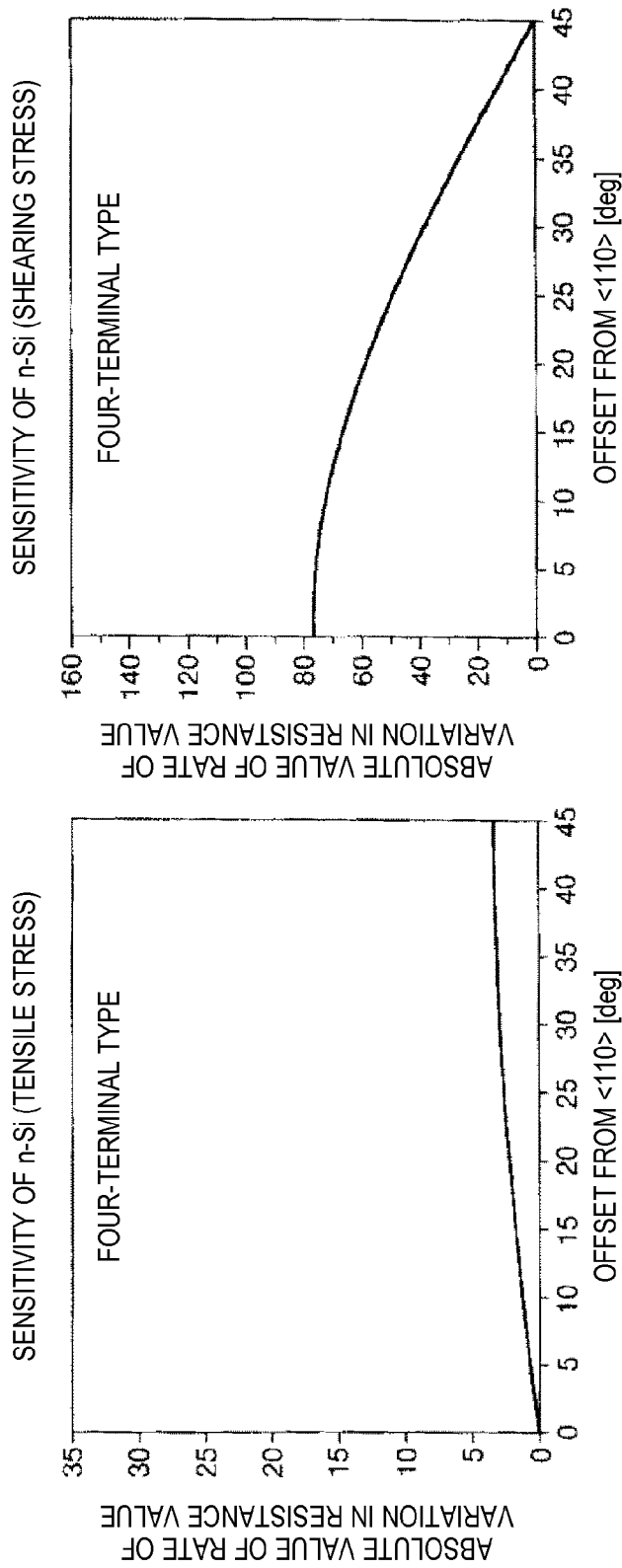
FIGS. 16A and 16B are graphs showing the relationships between a posture (an angle α) of the four-terminal-type strain detection element and absolute values of rates of variation in the resistance value due to tensile stress and shearing stress when n-type silicon is used in the piezoresistive region.
Figures 17A, 17B:
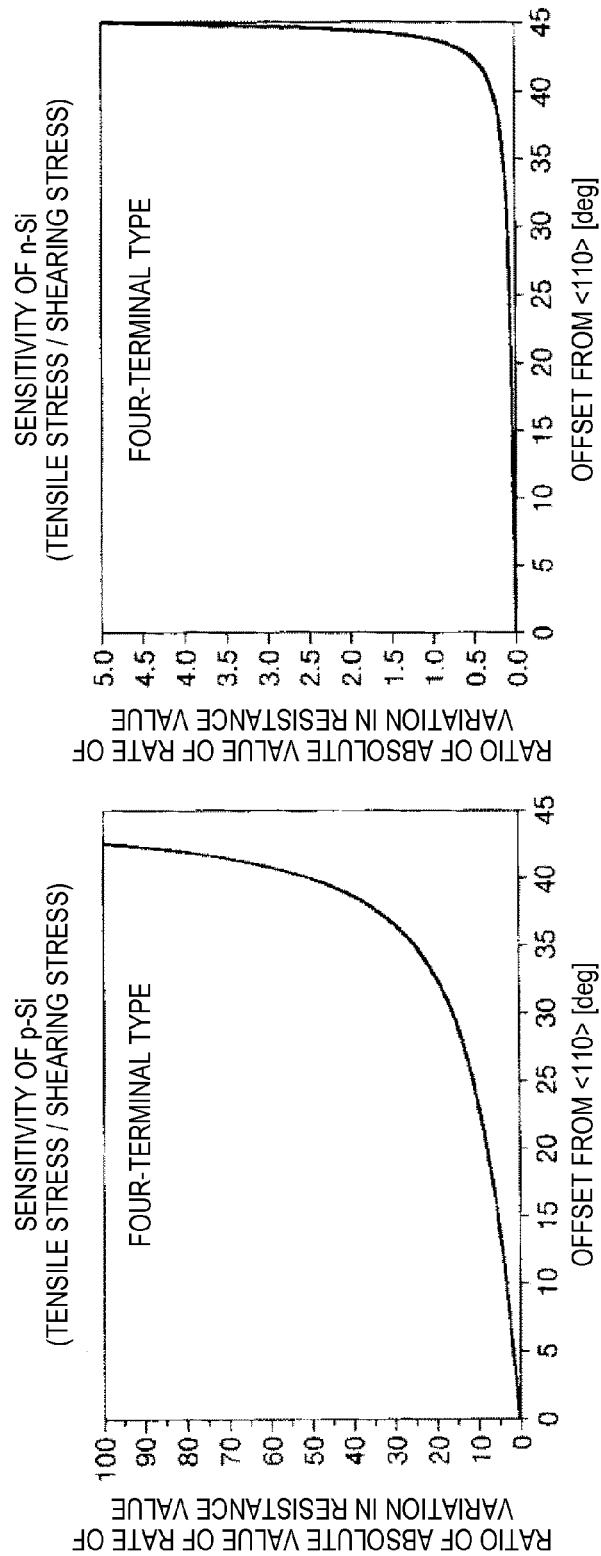
FIGS. 17A and 17B are graphs showing the relationships between a posture (an angle α) of the four-terminal-type strain detection element and ratios of the absolute values of the rates of variation in the resistance value due to tensile stress and shearing stress.

FIG. 13 is a plan view showing an optical scanner according to a second embodiment of the invention, and FIG. 14 is a diagram for illustrating a strain detection element of the optical scanner shown in FIG. 13. FIGS. 15A and 15B are graphs showing the relationships between a posture (an angle α) of a four-terminal-type strain detection element and absolute values of rates of variation in the resistance value due to tensile stress and shearing stress when p-type silicon is used in a piezoresistive region. FIGS. 16A and 16B are graphs showing the relationships between a posture (an angle α) of the four-terminal-type strain detection element and absolute values of rates of variation in the resistance value due to tensile stress and shearing stress when n-type silicon is used in the piezoresistive region. FIGS. 17A and 17B are graphs showing the relationships between a posture (an angle α) of the four-terminal-type strain detection element and ratios of the absolute values of the rates of variation in the resistance value due to tensile stress and shearing stress.

The optical scanner according to this embodiment is the same as the optical scanner according to the above-described first embodiment, except that the strain detection element has a different configuration.

Regarding the second embodiment, differences from the above-described embodiment will be mainly described in the following description, and the description of the same items will be omitted. In FIGS. 13 and 14, the same configurations as in the above-described embodiment will be denoted by the same reference symbols.

An optical scanner 1A shown in FIG. 13 has strain detection elements 51A and 52A, in place of the strain detection elements 51 and 52 of the above-described first embodiment.

The strain detection element 51A (a first strain detection element) is disposed in a shaft portion 14a to detect the deformation (bending deformation and torsional deformation) of the shaft portion 14a. The strain detection element 52A (a second strain detection element) is disposed in a shaft portion 14b to detect the deformation (bending deformation and torsional deformation) of the shaft portion 14b.

The strain detection elements 51A and 52A are disposed to be symmetric with respect to a Y-axis when viewed from above. Hereinafter, the strain detection element 51A will be mainly described, and since the strain detection element 52A is the same as the strain detection element 51A, the description thereof will be omitted.

In this embodiment, the strain detection element 51A is disposed at an end portion of the shaft portion 14a on the side of a fixed portion 15.

The strain detection element 51A is a four-terminal-type piezoresistive element.

Specifically, as shown in FIG. 14, the strain detection element 51A has a piezoresistive region 511A and a pair of input terminals 512A and 513A and a pair of output terminals 514A and 515A that are disposed on the piezoresistive region 511A.

The piezoresistive region 511A is formed by doping impurities into a surface of the shaft portion 14a.

In this embodiment, the piezoresistive region 511A has a square shape when viewed from above.

In this embodiment, the whole piezoresistive region 511A is provided on the shaft portion 14a. The position of the piezoresistive region 511A is not limited to the position shown in the drawing as long as it can receive tensile stress or compressive stress caused by the bending deformation of the shaft portion 14a and can receive shearing stress caused by the torsional deformation of the shaft portion 14a. For example, the piezoresistive region 511A may be provided across a boundary portion between the shaft portion 14a and the fixed portion 15.

The pair of input terminals 512A and 513A is disposed side by side in a direction inclined with respect to a longitudinal direction (that is, an X-axis direction) of the shaft portion 14a on the piezoresistive region 511A, and the pair of output terminals 514A and 515A is disposed side by side in a direction perpendicular to the direction in which the pair of input terminals 512A and 513A is provided side by side.

The pair of input terminals 512A and 513A is electrically connected to a strain detection element drive circuit 53 via a pair of terminals 83a and 83b provided in the fixed portion 15.

The pair of output terminals 514A and 515A is electrically connected to a first signal processing circuit 71 and a second signal processing circuit 72 via a pair of terminals 83c and 83d provided in the fixed portion 15.

In the strain detection element 51A, the strain detection element drive circuit 53 applies a voltage between the pair of input terminals 512A and 513A with a constant voltage or a constant current. Accordingly, an electric field E is generated in a direction inclined with respect to the longitudinal direction of the shaft portion 14a on the piezoresistive region 511A. When shearing stress is caused based on the electric field E in the piezoresistive region 511A along with the torsional deformation of the shaft portion 14a, the specific resistance value of the piezoresistive region 511A varies according to the degree of the shearing stress, and a potential difference between the pair of output terminals 514A and 515A varies.

The potential difference varies according to an amount of the torsional deformation of the shaft portion 14a and the swing angles of the movable mirror portion 11 and the frame body portion 13 around the X-axis. Accordingly, the behavior of the movable mirror portion 11 around the X-axis can be detected based on the potential difference.

In addition, when tensile stress is caused based on the electric field E in the piezoresistive region 511A along with the bending deformation of the shaft portion 14a, the specific resistance value of the piezoresistive region 511A varies according to the degree of the tensile stress, and a potential difference between the pair of output terminals 514A and 515A varies.

The potential difference varies according to an amount of the bending deformation of the shaft portion 14a and the swing angles of the movable mirror portion 11 and the frame body portion 13 around the Y-axis. Accordingly, the behavior of the movable mirror portion 11 around the Y-axis can be detected based on the potential difference.

Accordingly, the detection signals of the strain detection element 51A include signals based on the bending deformation and the torsional deformation of the shaft portion 14a.

In this embodiment, since the pair of input terminals 512A and 513A is disposed side by side in the direction inclined with respect to the X-axis direction on the piezoresistive region 511A, the signals based on the bending deformation and the torsional deformation of the shaft portion 14a that are included in the signals output from the strain detection element 51A can be increased.

A ratio between the signal based on the bending deformation of the shaft portion 14a and the signal based on the torsional deformation of the shaft portion 14a, included in the detection signals of the strain detection element 51A, varies according to the angle α (the inclination angle) of the strain detection element 51A. Here, the angle α is an angle formed between the longitudinal direction (that is, the X-axis direction) of the shaft portion 14a and the direction in which the pair of input terminals 512A and 513A ise provided side by side (the direction of the straight line connecting the pair of input terminals 512A and 513A at the shortest distance).

Hereinafter, regarding the detection signals of the strain detection element 51A, an exemplary case in which the longitudinal direction of the shaft portion 14a matches a <110> direction of the crystal axis of silicon single crystal will be described in detail.

When the piezoresistive region 511A is made of p-type silicon single crystal, the absolute value of the rate of variation in the resistance value related to the tensile stress of the piezoresistive region 511A between the pair of output terminals 514A and 515A is increased with an increase in the angle α (offset from <110>) as shown in FIG. 15A. That is, the larger the angle α, the larger the signal based on the bending deformation of the shaft portion 14a that is included in the detection signals of the strain detection element 51A.

In this case, the absolute value of the rate of variation in the resistance value related to the shearing stress of the piezoresistive region 511A between the pair of output terminals 514A and 515A is reduced with an increase in the angle α as shown in FIG. 15B. That is, the larger the angle α, the smaller the signal based on the torsional deformation of the shaft portion 14a that is included in the detection signals of the strain detection element 51A. The variation of the signal based on the torsional deformation with the angle α is smaller than the variation of the signal based on the bending deformation with the angle α.

In addition, when the piezoresistive region 511A is made of n-type silicon single crystal, the absolute value of the rate of variation in the resistance value related to the tensile stress of the piezoresistive region 511A between the pair of output terminals 514A and 515A is increased with an increase in the angle α as shown in FIG. 16A. That is, the larger the angle α, the larger the signal based on the bending deformation of the shaft portion 14a that is included in the detection signals of the strain detection element 51A. The variation of the signal based on the bending deformation with the angle α is small.

In this case, the absolute value of the rate of variation in the resistance value related to the shearing stress of the piezoresistive region 511A between the pair of output terminals 514A and 515A is reduced with an increase in the angle α as shown in FIG. 16B. That is, the larger the angle α, the smaller the signal based on the torsional deformation of the shaft portion 14a that is included in the detection signals of the strain detection element 51A. The variation of the signal based on the torsional deformation with the angle α is larger than the variation of the signal based on the bending deformation with the angle α.

In addition, when the piezoresistive region 511A is made of p-type silicon single crystal, a ratio (R1/R2) of the absolute value (R1) of the rate of variation in the resistance value related to the tensile stress of the piezoresistive region 511A between the pair of output terminals 514A and 515A to the absolute value (R2) of the rate of variation in the resistance value related to the shearing stress is increased with an increase in the angle α as shown in FIG. 17A. That is, the larger the angle α, the larger the ratio of the signal based on the bending deformation to the signal based on the torsional deformation of the shaft portion 14a, included in the detection signals of the strain detection element 51A.

In addition, when the piezoresistive region 511A is made of n-type silicon single crystal, a ratio (R1/R2) of the absolute value (R1) of the rate of variation in the resistance value related to the tensile stress of the piezoresistive region 511A between the pair of output terminals 514A and 515A to the absolute value (R2) of the rate of variation in the resistance value related to the shearing stress is increased with an increase in the angle α as shown in FIG. 17B. That is, the larger the angle α, the larger the ratio of the signal based on the bending deformation to the signal based on the torsional deformation of the shaft portion 14a, included in the detection signals of the strain detection element 51A. The ratio is reduced regardless of the angle α and a variation thereof with the angle α is also small.

From the above description, in a case in which the longitudinal direction of the shaft portion 14a matches a <110> direction of the crystal axis of silicon single crystal, when the piezoresistive region 511A is made of p-type silicon single crystal, signals based on the bending deformation and the torsional deformation of the shaft portions 14a that are included in signals output from the strain detection element 51A can be efficiently increased.

The angle α varies with a conductivity type and a crystal axis direction of the silicon single crystal constituting the shaft portions 14a and 14b, and is not particularly limited. For example, when the longitudinal directions of the shaft portions 14a and 14b match a <110> direction of the crystal axis of the silicon single crystal and the piezoresistive region 511A is made of p-type silicon single crystal, the angle α is preferably 22° to 42°, and more preferably 38° to 42°. As shown in FIG. 17A, the above-described ratio (R1/R2) can be adjusted in a range of about 10% to 90% by adjusting the angle α to 22° to 42°. In addition, the above-described ratio (R1/R2) can be adjusted in a range of about 40% to 60% by adjusting the angle α to 38° to 42°.

The detection signals of the strain detection element 51A are input to the first signal processing circuit 71 (a first signal processing portion) and the second signal processing circuit 72 (a second signal processing portion). Similarly, the detection signals of the strain detection element 52A are input to the first signal processing circuit 71 and the second signal processing circuit 72. The strain detection element 52A is electrically connected to the strain detection element drive circuit 53 via the terminals 84a and 84b, and is electrically connected to the first signal processing circuit 71 and the second signal processing circuit 72 via the terminals 84c and 84d.

For example, the first signal processing circuit 71 includes a differential amplification circuit, and amplifies a difference between the detection signal of the above-described strain detection element 51A and the detection signal of the strain detection element 52A configured in the same manner as the strain detection element 51A. Accordingly, the torsional deformation component included in the signals from the strain detection elements 51A and 52A can be removed and the bending deformation component can be amplified.

Similarly, for example, the second signal processing circuit 72 includes a differential amplification circuit, and amplifies a difference between the detection signal of the above-described strain detection element 51A and the detection signal of the strain detection element 52A configured in the same manner as the strain detection element 51A. Accordingly, the bending deformation component included in the signals from the strain detection elements 51A and 52A can be removed and the torsional deformation component can be amplified.

Also according to the above-described optical scanner 1A according to the second embodiment, the behaviors of the movable mirror portion 11 around the Y-axis and the X-axis can be detected based on the detection signals of the strain detection elements 51A and 52A disposed in the shaft portions 14a and 14b. Since the strain detection elements 51A and 52A are disposed only in the shaft portions 14a and 14b, the wiring (not shown) connected to the strain detection elements 51A and 52A is not required to be disposed in the shaft portions 12a and 12b or to be disposed over the entire area in the longitudinal direction of the shaft portions 14a and 14b. Therefore, disconnection of the wiring can be suppressed.

The above-described optical scanners 1 and 1A can be appropriately applied as, for example, optical scanners of image display devices such as imaging displays, e.g., projectors, head-up displays (HUD), and head-mounted displays (HMD). The image display devices have excellent reliability and can display a high-quality image.

Embodiments of Image Display Device

Figure 18:
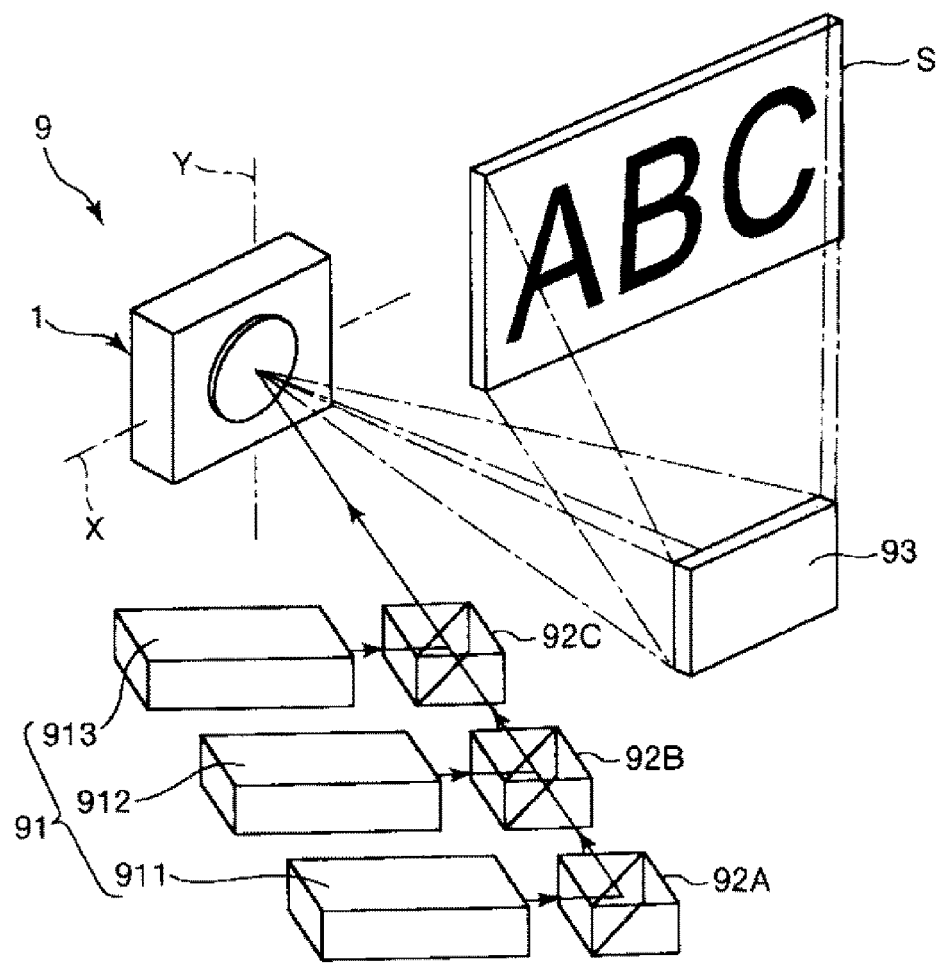
FIG. 18 is a diagram schematically showing an embodiment of an image display device of the invention.
Figure 19:
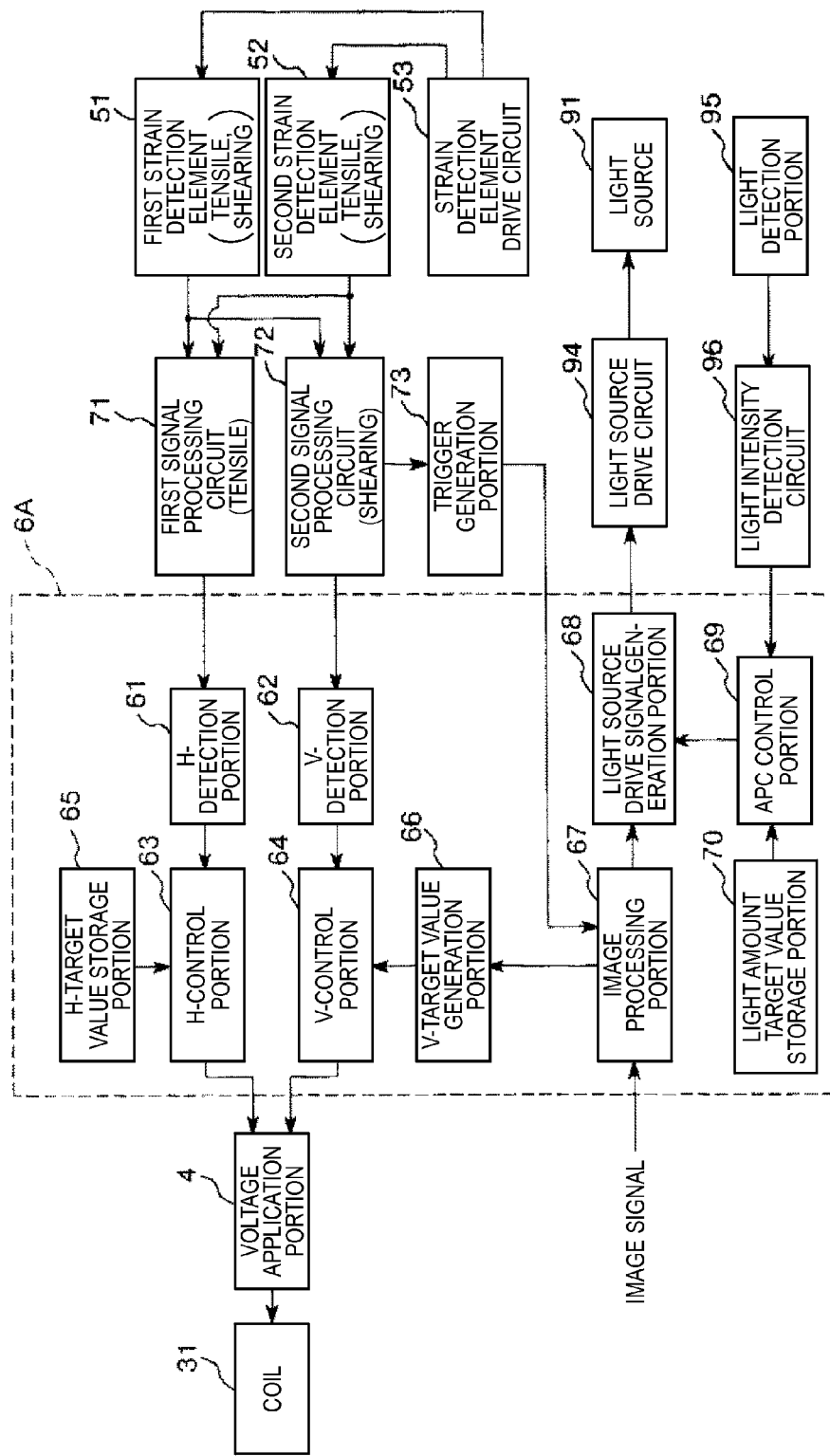
FIG. 19 is a block diagram showing a control system of the image display device shown in FIG. 18.

FIG. 18 is a diagram schematically showing an embodiment of an image display device of the invention, and FIG. 19 is a block diagram showing a control system of the image display device shown in FIG. 18. In FIG. 19, the same configurations as the above-described configurations will be denoted by the same reference symbols.

In this embodiment, as an example of the image display device, a case in which the optical scanner 1 is used as an optical scanner of an imaging display will be described. A longitudinal direction of a screen S will be referred to as "horizontal direction" and a direction perpendicular to the longitudinal direction will be referred to as "vertical direction". In addition, an X-axis is parallel to the horizontal direction of the screen S and a Y-axis is parallel to the vertical direction of the screen S.

An image display device (a projector) 9 has a light source device (a light source) 91 that emits light such as laser light, a plurality of dichroic mirrors 92A, 92B, and 92C, the optical scanner 1, a light source drive circuit 94, a light detection portion 95, a light intensity detection circuit 96, a control portion 6A, and a trigger generation portion 73.

The trigger generation portion 73 generates a signal for generating a trigger for starting of drawing in a horizontal scanning direction, based on a signal output from a second signal processing circuit. The trigger generation portion 73 is, for example, a comparator.

The control portion 6A has an image processing portion 67, a light source drive signal generation portion 68, an APC control portion 69, and a light amount target value storage portion 70.

The image processing portion 67 generates a drawing signal necessary for drawing based on an image signal input thereto, and outputs the drawing signal to the light source drive signal generation portion 68 based on a signal output from the trigger generation portion 73. In addition, the image processing portion 67 outputs line information in a vertical scanning direction to a V-target value generation portion 66.

The light source drive signal generation portion 68 generates a drive signal for driving the light source drive circuit 94 based on the drawing signal output from the image processing portion 67. The association between the drawing signal from the image processing portion 67 and the drive signal for the light source drive circuit 94 is updated regularly based on a signal from the APC control portion 69.

The APC control portion 69 outputs, to the light source drive signal generation portion 68, a signal for correcting the association so that the association between the emission intensity of the light source device 91 and the data of the image signal reaches a target value regardless of environmental changes.

The light source drive circuit 94 generates a drive current for driving the light source device 91 based on the drive signal from the light source drive signal generation portion 68.

The light intensity detection circuit 96 converts the output from the light detection portion 95 such as a photodiode that detects an emission intensity of the light source device 91 into a signal necessary for signal processing. The light intensity detection circuit 96 is configured to include, for example, an amplification circuit, a filter, an AD converter, and the like.

The light source device 91 is provided with a red light source device 911 that emits red light, a blue light source device 912 that emits blue light, and a green light source device 913 that emits green light.

The dichroic mirrors 92A, 92B, and 92C are optical elements that synthesize light emitted from the red light source device 911, the blue light source device 912, and the green light source device 913, respectively.

The image display device 9 synthesizes the light emitted from the light source device 91 (the red light source device 911, the blue light source device 912, and the green light source device 913) using the dichroic mirrors 92A, 92B, and 92C based on image information (an image signal) from a host computer (not shown), and the optical scanner 1 two-dimensionally scans the synthesized light to form a color image on the screen S.

In the two-dimensional scanning, the light reflected on a light reflection portion 114 is scanned (main scanning) in the horizontal direction of the screen S through the rotation of the movable mirror portion 11 of the optical scanner 1 around the Y-axis. Meanwhile, the light reflected on the light reflection portion 114 is scanned (sub-scanning) in the vertical direction of the screen S through the rotation of the movable mirror portion 11 of the optical scanner 1 around the X-axis.

FIG. 18 shows a configuration in which the light synthesized by the dichroic mirrors 92A, 92B, and 92C is two-dimensionally scanned by the optical scanner 1 and is then reflected on a fixed mirror 93 to form an image on the screen S. However, the fixed mirror 93 may be omitted to directly irradiate the screen S with the light two-dimensionally scanned by the optical scanner 1.

Hereinafter, application examples of the image display device will be described.

Application Example 1 of Image Display Device

Figure 20:
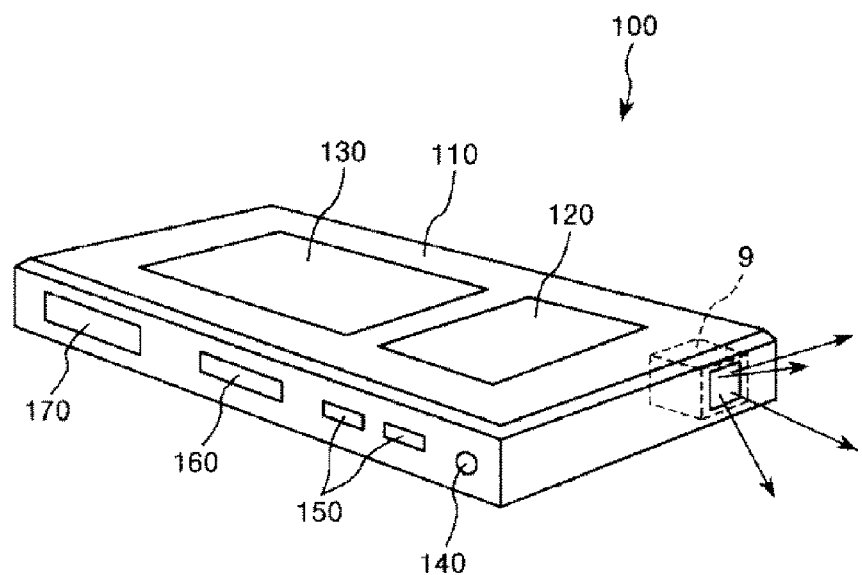
FIG. 20 is a perspective view showing an application example 1 of the image display device of the invention.

FIG. 20 is a perspective view showing an application example 1 of the image display device of the invention.

As shown in FIG. 20, the image display device 9 can be applied to a portable image display device 100.

The portable image display device 100 has a casing 110 that is formed with so dimensions that it can be held by hand, and the image display device 9 that is built in the casing 110. The portable image display device 100 can display a predetermined image on a predetermined surface such as a screen or a desk.

In addition, the portable image display device 100 has a display 120 that displays predetermined information, a keypad 130, an audio port 140, a control button 150, a card slot 160, and an AV port 170.

The portable image display device 100 may have other functions such as a telephone function and a GPS reception function.

Application Example 2 of Image Display Device

Figure 21:
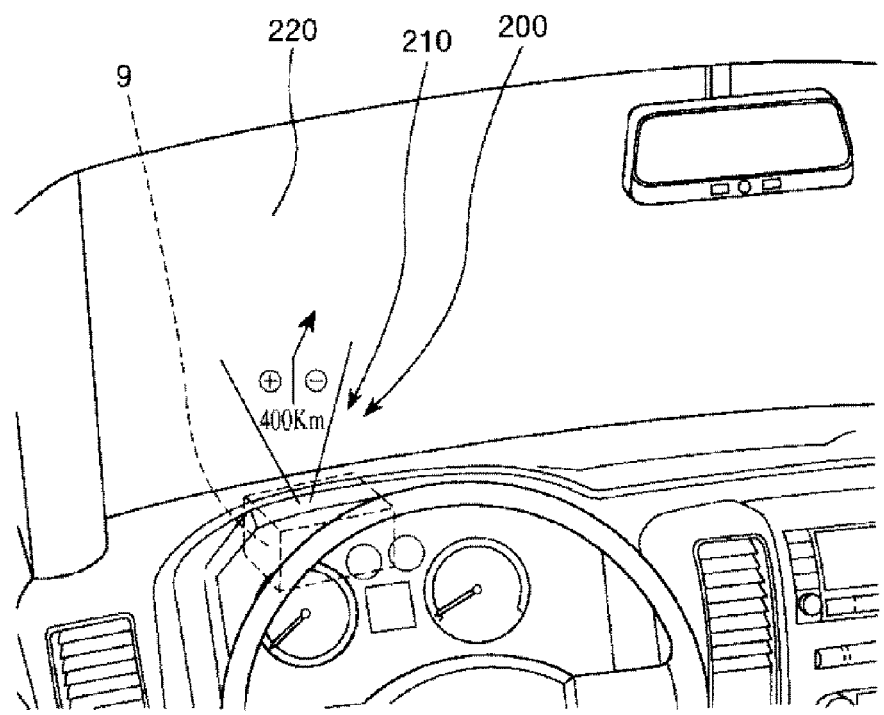
FIG. 21 is a perspective view showing an application example 2 of the image display device of the invention.

FIG. 21 is a perspective view showing an application example 2 of the image display device of the invention.

As shown in FIG. 21, the image display device 9 can be applied to a head-up display system 200.

In the head-up display system 200, the image display device 9 is mounted on a dashboard of a vehicle to configure a head-up display 210. The head-up display 210 can display a predetermined image such as guide display up to a destination on a windshield 220.

The head-up display system 200 can be applied not only to vehicles, but also to, for example, airplanes and ships.

Application Example 3 of Image Display Device

Figure 22:
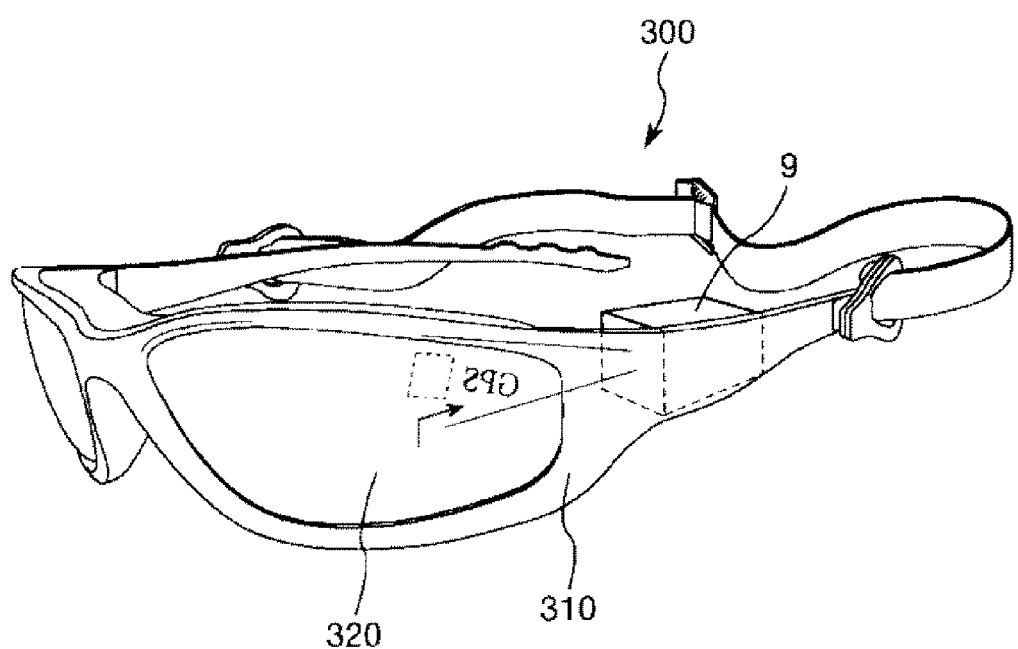
FIG. 22 is a perspective view showing an application example 3 of the image display device of the invention.

FIG. 22 is a perspective view showing an application example 3 of the image display device of the invention.

As shown in FIG. 22, the image display device 9 can be applied to a head-mounted display 300.

That is, the head-mounted display 300 has glasses 310 and the image display device 9 mounted on the glasses 310. The image display device 9 displays a predetermined image that is recognized with one eye on a display portion 320 provided in a portion corresponding to the original lens of the glasses 310.

The display portion 320 may be transparent or opaque. When the display portion 320 is transparent, information from the image display device 9 may be put and used on information from the real world.

The head-mounted display 300 may be provided with two image display devices 9 to display images that are recognized with both eyes on two display portions.

Although the optical scanner, the actuator, the image display device, and the head-mounted display of the invention have been described based on the embodiments shown in the drawings, the invention is not limited thereto. For example, in the optical scanner, the image display device, and the head-mounted display of the invention, the configurations of the portions can be substituted by arbitrary configurations and other arbitrary configurations may be added.

The invention may relate to a combination of arbitrary two or more configurations (characteristics) of the embodiments.

In the above-described embodiments, the exemplary case in which a moving magnet method is employed as a drive method for the optical scanner or the actuator has been described, but the invention is not limited thereto and can also be applied to an optical scanner or an actuator employing a moving coil method. In addition, the invention is not limited to the electromagnetic drive method such as the moving magnet method and the moving coil method, and can also be applied to other drive methods such as a piezoelectric drive method and an electrostatic drive method.

In the above-described embodiments, the exemplary case in which two (a pair of) first shaft portions are provided has been described, but the invention is not limited thereto. For example, four (two pairs of) or more first shaft portions may be provided.

In the above-described embodiments, the exemplary case in which two (a pair of) second shaft portions are provided has been described, but the invention is not limited thereto. For example, four (two pairs of) or more second shaft portions may be provided.

In the above-described embodiments, the exemplary case in which the light reflection plate completely covers the first shaft portions, the frame body portions, and the second shaft portions when viewed from above has been described. However, it is possible to obtain effects such as reduction of the optical device in size, increase of the light reflection plate in area, suppression of dynamic distortion of the light reflection plate, and suppression of stray light by the end portion of the first shaft portion on the base portion side, that have been described above, as long as the light reflection plate covers at least a part of the first shaft portion (the end portion of the movable mirror portion on the base portion side) when viewed from above.

In the above-described embodiments, the exemplary case in which the light reflection plate and the spacer are formed by processing a SOI substrate has been described, but the invention is not limited thereto. For example, the light reflection plate and the spacer may be formed from separate substrates.

In addition, the spacer between the light reflection plate and the base portion may be a solder ball. In this case, for example, metal films may be formed on the surfaces of the light reflection plate and the base portion on the spacer side, respectively, to bond the metal films to each other via the solder ball.

In the above-described embodiments, the exemplary case in which the light reflection plate is provided with the light reflection portion has been described, but the invention is not limited thereto. For example, the light reflection plate may be omitted and the light reflection portion may be provided in the base portion (the movable portion).

In addition, the arrangement, the number, the shape, the size, the number of terminals, and the like of the strain detection elements are not limited to the above-described embodiments as long as the bending deformation and the torsional deformation of the second shaft portion can be detected, and known strain detection elements can be used.

In the above-described embodiments, the exemplary case in which the strain detection element is disposed in each of the pair of second shaft portions has been described. However, a strain detection element that detects the bending deformation and the torsional deformation of the second shaft portion may be provided only in one of the pair of second shaft portions. In this case, for example, the first signal processing portion may be provided with a filter that removes a torsional component from the detection signals of the strain detection element and the second signal processing portion may be provided with a filter that removes a bending component from the detection signals of the strain detection element.

The entire disclosure of Japanese Patent Application No. 2013-055729, filed Mar. 18, 2013 is expressly incorporated by reference herein.

What is claimed is:

1. An optical scanner comprising:
   a movable portion that is provided with a light-reflective light reflection portion and is swingable around a first axis;
   a frame body portion that is swingable around a second axis that crosses the first axis;
   a first shaft portion that connects the movable portion and the frame body portion;
   a fixed portion;
   a second shaft portion that connects the frame body portion and the fixed portion;
   a strain detection element that is disposed in the second shaft portion to detect deformation of the second shaft portion;
   a first signal processing portion to which a detection signal of the strain detection element is input and that outputs a signal based on bending deformation of the second shaft portion; and a second signal processing portion to which a detection signal of the strain detection element is input and that outputs a signal based on torsional deformation of the second shaft portion, wherein a behavior of the movable portion around the first axis is detected based on the signal output from the first signal processing portion, and wherein a ratio between an amplitude at a resonance frequency related to the swinging of the movable portion around the first axis and an amplitude at a resonance frequency related to the swinging of the frame body portion around the first axis is used to estimate the behavior of the movable portion around the first axis based on the signal output from the first signal processing portion.

2. The optical scanner according to claim 1, wherein the strain detection element includes a piezoresistive region and a pair of terminals that is disposed side by side in a direction inclined with respect to a longitudinal direction of the second shaft portion on the piezoresistive region.

3. An image display device comprising:
the optical scanner according to claim 2; and
a light source that emits light,
wherein the light emitted from the light source is reflected on the light reflection portion to display an image.

4. A head-mounted display comprising:
the optical scanner according to claim 2; and
a light source that emits light,
wherein the light emitted from the light source is reflected on the light reflection portion to display an image as a virtual image.

5. The optical scanner according to claim 1, wherein the strain detection element is disposed at an end portion of the second shaft portion on the fixed portion side.

6. An image display device comprising:
the optical scanner according to claim 5; and
a light source that emits light,
wherein the light emitted from the light source is reflected on the light reflection portion to display an image.

7. A head-mounted display comprising:
the optical scanner according to claim 5; and
a light source that emits light,
wherein the light emitted from the light source is reflected on the light reflection portion to display an image as a virtual image.

8. The optical scanner according to claim 1, wherein an estimate of the behavior of the movable portion around the first axis based on the signal output from the first signal processing portion is made by an observer external to the optical scanner.

9. An image display device comprising:
the optical scanner according to claim 8; and
a light source that emits light,
wherein the light emitted from the light source is reflected on the light reflection portion to display an image.

10. A head-mounted display comprising:
the optical scanner according to claim 8; and
a light source that emits light,
wherein the light emitted from the light source is reflected on the light reflection portion to display an image as a virtual image.

11. The optical scanner according to claim 1, wherein a pair of the second shaft portions is provided with the frame body portion interposed therebetween, and wherein the strain detection element is disposed in each of the pair of second shaft portions.

12. The optical scanner according to claim 1, wherein a behavior of the movable portion around the second axis is detected based on the signal output from the second signal processing portion.

13. An image display device comprising:
the optical scanner according to claim 1; and
a light source that emits light,
wherein the light emitted from the light source is reflected on the light reflection portion to display an image.

14. A head-mounted display comprising:
the optical scanner according to claim 1; and
a light source that emits light,
wherein the light emitted from the light source is reflected on the light reflection portion to display an image as a virtual image.

15. An optical scanner comprising:
a movable portion that is provided with a light-reflective light reflection portion and is swingable around a first axis;
a frame body portion that is swingable around a second axis that crosses the first axis;
a first shaft portion that connects the movable portion and the frame body portion;
a fixed portion; and
a second shaft portion that connects the frame body portion and the fixed portion,
wherein a strain detection element is disposed only in the second shaft portion, and
wherein detection signals of the strain detection element include signals based on bending deformation and torsional deformation of the second shaft portion,
wherein a behavior of the movable portion around the first axis is detected based on the detection signals from the strain detection element, and
wherein a ratio between an amplitude at a resonance frequency related to the swinging of the movable portion around the first axis and an amplitude at a resonance frequency related to the swinging of the frame body portion around the first axis is used to estimate the behavior of the movable portion around the first axis based on the detection signals from the strain detection element.

16. An image display device comprising:
the optical scanner according to claim 15; and
a light source that emits light,
wherein the light emitted from the light source is reflected on the light reflection portion to display an image.

17. A head-mounted display comprising:
the optical scanner according to claim 15; and
a light source that emits light,
wherein the light emitted from the light source is reflected on the light reflection portion to display an image as a virtual image.

18. An actuator that has a gimbal structure in which a movable portion is supported swingably around a first axis with a first shaft portion that is supported by a frame body portion inside the frame body portion and the frame body portion is supported swingably around a second axis that crosses the first axis with a second shaft portion outside the frame body portion, comprising:
a strain detection element that is disposed in the second shaft portion to detect deformation of the second shaft portion,
wherein signals based on bending deformation and torsional deformation of the second shaft portion that are included in detection signals of the strain detection element are used to detect behaviors of the movable portion around the first axis and the second axis, wherein a behavior of the movable portion around the first axis is detected based on the detection signals from the strain detection element, and wherein a ratio between an amplitude at a resonance frequency related to the swinging of the movable portion around the first axis and an amplitude at a resonance frequency related to the swinging of the frame body portion around the first axis is used to estimate the behavior of the movable portion around the first axis based on the detection signals from the strain detection element.

* * * * *